(12) United States Patent
Wang et al.

(10) Patent No.: US 7,314,605 B2
(45) Date of Patent: Jan. 1, 2008

(54) MICROPOROUS CRYSTALLINE METAL SILICATES AND PROCESSES FOR THEIR PREPARATION

(75) Inventors: Xiqu Wang, Houston, TX (US); Lumei Liu, Houston, TX (US); Allan J. Jacobson, Houston, TX (US)

(73) Assignee: The University of Houston System, Houston, TX (US)

(*) Notice: Subject to any disclaimer, the term of this patent is extended or adjusted under 35 U.S.C. 154(b) by 108 days.

(21) Appl. No.: 10/466,964

(22) PCT Filed: Feb. 2, 2002

(86) PCT No.: PCT/US02/03173

§ 371 (c)(1),
(2), (4) Date: Jul. 21, 2003

(87) PCT Pub. No.: WO02/062703

PCT Pub. Date: Aug. 15, 2002

(65) Prior Publication Data

US 2004/0067188 A1 Apr. 8, 2004

Related U.S. Application Data

(60) Provisional application No. 60/266,252, filed on Feb. 2, 2001.

(51) Int. Cl.
*C01B 33/38* (2006.01)

(52) U.S. Cl. .................. 423/326; 423/331; 423/334
(58) Field of Classification Search ............. 423/326, 423/531, 334
See application file for complete search history.

(56) References Cited

U.S. PATENT DOCUMENTS

| | | | | | |
|---|---|---|---|---|---|
| 4,761,391 | A | * | 8/1988 | Occelli | 502/63 |
| 4,791,088 | A | * | 12/1988 | Chu et al. | 502/232 |
| 5,068,216 | A | * | 11/1991 | Johnson et al. | 502/241 |
| 5,208,006 | A | * | 5/1993 | Kuznicki et al. | 423/713 |
| 5,243,114 | A | * | 9/1993 | Johnson et al. | 585/329 |
| 5,278,115 | A | * | 1/1994 | Kresge et al. | 502/84 |

OTHER PUBLICATIONS

Evans, Jr, "The Crystal Structures of Cavansite and Pentagonite," American Mineralogists, vol. 58, pp. 412-424, 1973.*
Anderson et al., "Structure of the microporous titanosilicate ETS-10," NATURE, vol. 367, p. 347, Jan. 1994.*

* cited by examiner

*Primary Examiner*—David M Brunsman
(74) *Attorney, Agent, or Firm*—Robert W Strozier

(57) ABSTRACT

New bridged layered silicates are disclosed where the bridging groups bridge adjacent silicate layers via oxygen atoms on each silicate layer that are unshared to produce porous three dimensional structures. Methods for making these bridged layered silicates are disclosed as well as methods for using these compositions as catalysts, supports, adsorbents, drying agents and ion exchangers.

26 Claims, 10 Drawing Sheets

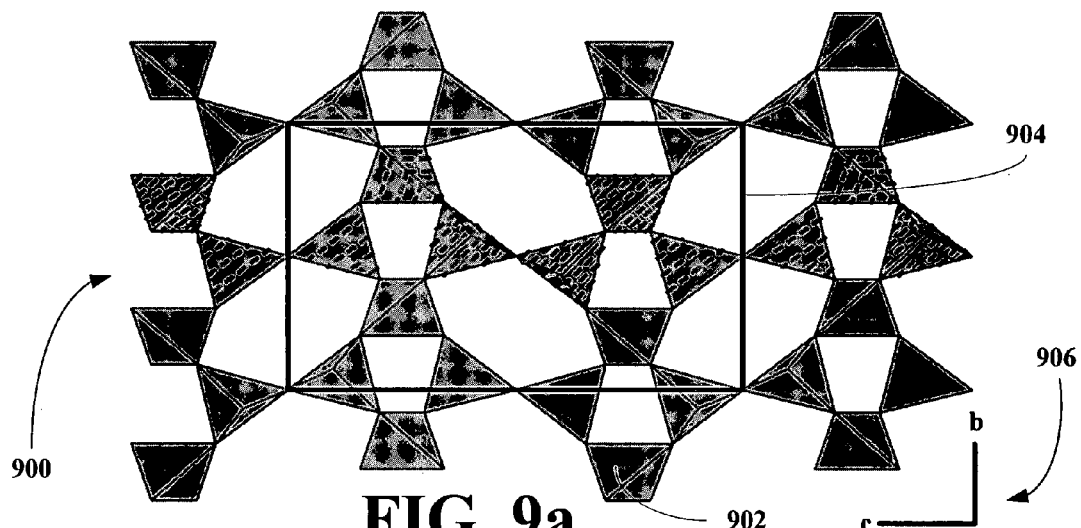
FIG. 9a
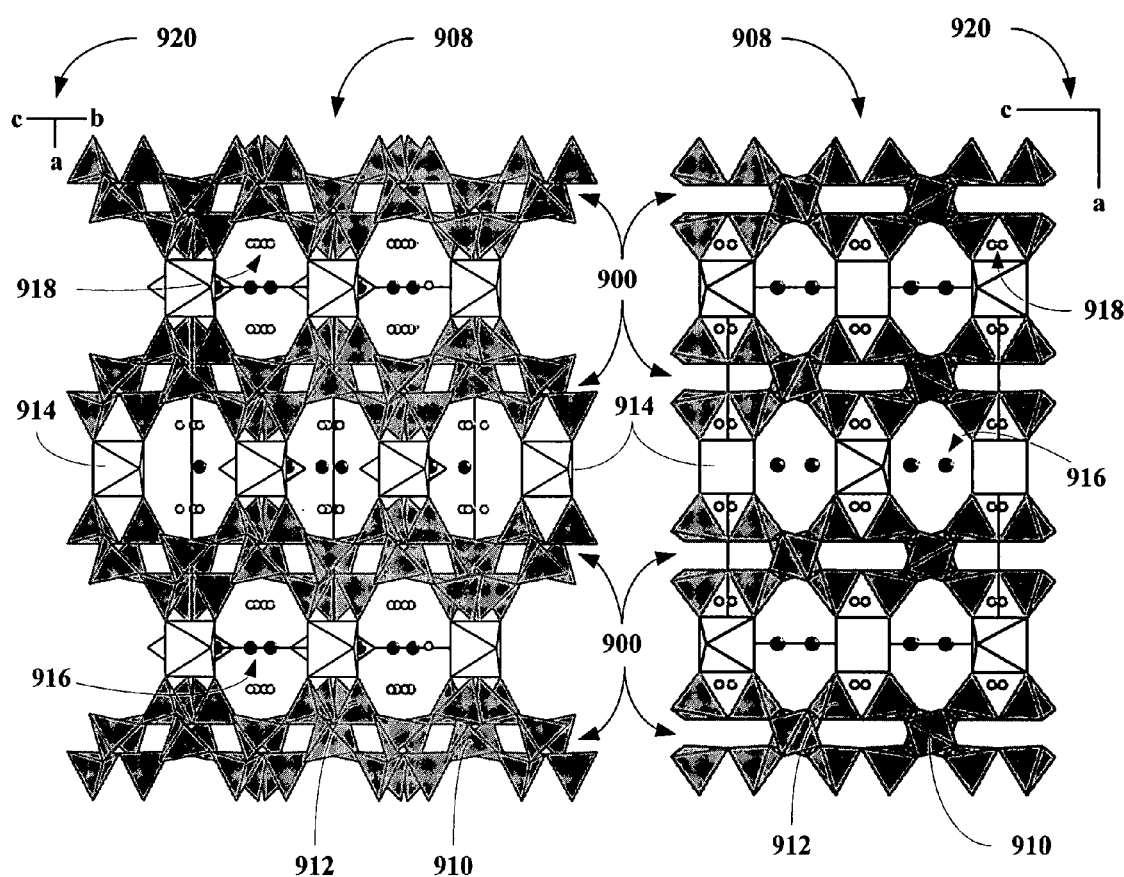
FIG. 9b  FIG. 9c

MICROPOROUS CRYSTALLINE METAL SILICATES AND PROCESSES FOR THEIR PREPARATION

RELATED APPLICATIONS

This application is a 35 U.S.C. § 371 National Phase Application of PCT/US02/03173 filed 31 Jan. 2002, which claims provisional priority to U.S. Provisional Patent Application Ser. No. 60/266,252 filed 2 Feb. 2001.

BACKGROUND OF THE INVENTION

1. Field of the Invention

The invention relates to novel microporous crystalline silicates and to processes for their preparation and use as adsorbents, drying agents, ion exchangers and catalysts or catalyst carriers for various catalytic processes.

More particularly, the present invention relates to a family of new microporous crystalline compositions, referred to herein as MSH-n compositions, having the general formula:

$$A_r[M_s\{(Si_2O_5)_p(SiO_2)_q\}] \cdot tH_2O \quad (I)$$

where $(Si_2O_5)_p(SiO_2)_q$ represents a silicate layer and M represents bridging groups interposed between adjacent silicate layers including one or more transition metals and A is an alkali or alkaline earth metal cation and water molecules occupy non-framework position in the composition as synthesized and where p and q are numbers having values representing a structure of the silicate layer, r is a number having a value representing the number of alkali and/or alkaline earth metal cations needed to render the composition neutral, s is a number having a value representing a number of bridging groups, and t is a number having a value representing the state of hydration of the composition. The present invention also describes processes for preparing the composition and methods for using the compositions.

2. Description of the Related Art

Zeolites are crystalline aluminosilicate molecular sieves that have microporous framework structures built from $AlO_4$ and $SiO_4$ tetrahedra. The tetrahedra are linked to form a structure that is characterized by the presence of micropores with dimensions in the range of 3 to about 15 Å and by the presence of exchangeable cations and sorbed molecules. Other classes of microporous oxide material that are not zeolites but which show similar ion exchange and molecule sorption properties such as aluminophosphates, U.S. Pat. No. 4,310,440, silicon substituted aluminophosphates, U.S. Pat. No. 4,440,871, and metal substituted aluminophosphates, U.S. Pat. No. 4,853,197 metallo zinc-phosphates, U.S. Pat. No. 5,302,362 have been described.

In addition to frameworks that are based on tetrahedral silicon or aluminum or metal oxide units, microporous compounds are also known that have frameworks constructed from octahedrally coordinated titanium, zirconium, or hafnium in combination with silicate or germanate tetrahedra For example U.S. Pat. Nos. 4,853,202, and 4,938,939, both issued to S. Kuzrnicki, describe the synthesis of microporous titanosilicates, whereas U.S. Pat. Nos. 5,891,417, and 5,888,472 both issued to Bem et al., describe microporous zirconium silicates and germanates. In addition to synthesized compositions, a large number of zirconium and titanium silicates are known to occur as minerals. Rocha and Anderson in the Eur. J. Inorg. Chem. 2000 801, provide a survey of the known mixed octahedral tetrahedral frameworks.

Notwithstanding the extensive previous work, a novel class of silicates containing vanadium and other metals with interstices of molecular dimensions, which are usually filled with water of hydration have been synthesized. The microporous silicates of the invention are characterized by their overall composition, their adsorption behavior and their ion exchange properties. The crystallinity of the various compounds follows from the fact that they all show a clear X-ray powder diffraction pattern.

SUMMARY OF THE INVENTION

General

The present invention provides a 3D silicate compositions including a plurality of silicate layers and sufficient bridging groups to form a substantially stable 3D structure at least one bridging group including a transition metal, where the bridging groups are interposed between adjacent silicate layers and share at least one oxygen atom with a silicon atom of each layer.

The present invention provides a 3D silicate compositions including a plurality of silicate layers and sufficient non-transition metal-containing bridging groups and transition metal-containing bridging groups to form a substantially stable 3D structure, where the bridging groups are interposed between adjacent silicate layers and share at least one oxygen atom with a silicon atom of each layer.

The present invention provides a 3D silicate compositions including a plurality of silicate layers and sufficient transition metal-containing bridging groups to form a substantially stable 3D structure, where the bridging groups are interposed between adjacent silicate layers and share at least one oxygen atom with a silicon atom of each layer.

General with Formulas

The present invention relates to a family of crystalline compositions, referred to herein as MSH-n compositions, represented by general formula (I):

$$A_r[M_s\{(Si_2O_5)_p(SiO_2)_q\}] \cdot tH_2O \quad (I)$$

where $(Si_2O_5)_p(SiO_2)_q$ represents a silicate layer; M represents bridging groups interposed between adjacent silicate layers at least one bridging group including a transition metal; A is an alkali or alkaline earth metal cation; p and q are numbers having values representing a structure of the silicate layer; r is a number having a value representing the number of alkali and/or alkaline earth metal cations needed to render the composition neutral; s is a number having a value representing a number of bridging groups; t is a number having a value representing a state of hydration of the composition or the number of water molecules associated with the composition; and the A cations and the water molecules occupy non-framework position in the composition as synthesized.

The present invention provides a family of ion exchanged crystalline compositions having the general formula:

$$A_{r1}A'_{r2}[M_s\{(Si_2O_5)_p(SiO_2)_q\}] \cdot tH_2O \quad (II)$$

where $(Si_2O_5)_p(SiO_2)_q$ represents a silicate layer; M represents bridging groups interposed between adjacent silicate layers at least one bridging group including a transition metal; A is an alkali or alkaline earth metal cation; A' is an ion-exchanged cation selected from the groups consisting of $H^+$, the same or different alkali or alkaline earth metal cation, or other ion-exchangeable cations; p and q are numbers having values representing a structure of the silicate layer; r1 and r2 are numbers having a value representing the number of A and A' cations needed to render the composition neutral; s is a number having a value representing a number of bridging groups; t is a number having a value representing a state of hydration of the composition; and the A cations, the A' cations and the water molecules occupy non-framework position in the composition as synthesized.

The present invention provides a family of catalysts having the general formula:

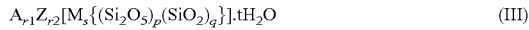 (III)

where $(Si_2O_5)_p(SiO_2)_q$ represents a silicate layer; M represents bridging groups interposed between adjacent silicate layers at least one bridging group including a transition metal; A is an alkali or alkaline earth metal cation; Z is a catalytically active group or a precursor of a catalytically active group; p and q are numbers having values representing a structure of the silicate layer, r1 and r2 are numbers having a value representing the number of A cations and/or Z groups needed to render the composition neutral; s is a number having a value representing a number of bridging groups; t is a number having a value representing a state of hydration of the composition; and the A cations, the Z groups and the water molecules occupy non-framework position in the composition as synthesized.

The present invention relates to a family of crystalline compositions, referred to herein as MSH-n compositions, having the general formula:

 (IV)

where $(Si_2O_5)_p(SiO_2)_q$ represents a silicate layer, p and q are numbers having values representing a structure of the silicate layer and n is a number representing a number of layers and M represents bridging groups interposed between adjacent silicate layers at least one bridging group including a transition metal and s is a number having a value representing a number of bridging groups; A is an alkali or alkaline earth metal cation and r is a number having a value representing the number of alkali and/or alkaline earth metal cations needed to render the composition neutral; t is a number having a value representing the state of hydration of the composition; and the A cations and the water molecules occupy non-framework position in the composition as synthesized.

The present invention relates to a family of crystalline compositions, referred to herein as MSH-n compositions, having the general formula:

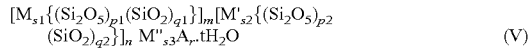 (V)

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the first silicate layers M' represents bridging groups interposed between adjacent layers of the second silicate layers, M" represents bridging groups interposed between the first layered substructure and the second layered substructure, at least one M, M' or M" including transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation and r is a number having a value representing the number of alkali and/or alkaline earth metal cations needed to render the composition neutral; t is a number having a value representing the state of hydration of the composition; and the A cations and the water molecules occupy non-framework position in the composition as synthesized.

The present invention provides a family of ion-exchanged crystalline compositions, referred to herein as MSH-n compositions, having the general formula:

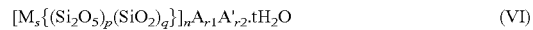 (VI)

where $(Si_2O_5)_p(SiO_2)_q$ represents a silicate layer, p and q are numbers having values representing a structure of the silicate layer and n is a number representing a number of layers and M represents bridging groups interposed between adjacent silicate layers at least one bridging group including a transition metal and s is a number having a value representing a number of bridging groups; A is an alkali or alkaline earth metal cation; A' is an ion-exchanged cation selected from the groups consisting of $H^+$, the same or different alkali or alkaline earth metal cation, or other ion-exchangeable cations; p and q are numbers having values representing a structure of the silicate layer; r1 and r2 are numbers having a value representing the number of A and A' cations needed to render the composition neutral; t is a number having a value representing the state of hydration of the composition; and the A cations, the A' cations and the water molecules occupy non-framework position in the composition as synthesized.

The present invention provides a family of catalysts having the general formula:

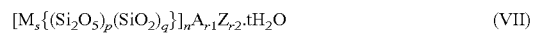 (VII)

where $(Si_2O_5)_p(SiO_2)_q$ represents a silicate layer, p and q are numbers having values representing a structure of the silicate layer and n is a number representing a number of layers and M represents bridging groups interposed between adjacent silicate layers at least one bridging group including a transition metal and s is a number having a value representing a number of bridging groups; A is an alkali or alkaline earth metal cation; Z is a catalytically active group or a precursor of a catalytically active group; p and q are numbers having values representing a structure of the silicate layer; r1 and r2 are numbers having a value representing the number of A cations and/or Z groups needed to render the composition neutral; t is a number having a value representing the state of hydration of the composition; and the A cations, the Z groups and the water molecules occupy non-framework position in the composition as synthesized.

The present invention provides a family of ion-exchanged crystalline compositions, referred to herein as MSH-n compositions, having the general formula:

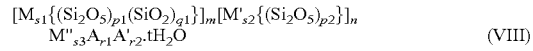 (VIII)

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the fit silicate layers, M' represents bridging groups interposed between adjacent layers of the second silicate layers, M" represents bridging groups interposed between the first layered substructure and the second layered substructure, at least one M, M' or M" including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation; A' is an ion-exchanged cation selected from the groups consisting of $H^+$, the same or different alkali or alkaline earth metal cation, or other ion-exchangeable cations; p and q are numbers having values representing a structure of the silicate layer; r1 and r2 are numbers having a value representing the number of A cations and A' cations needed to render the composition neutral; t is a number having a value representing the state of hydration of the composition; and the A cations, the A' cations and the water molecules occupy non-framework position in the composition as synthesized.

The present invention provides a family of catalysts having the general formula:

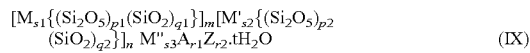
(IX)

where $(Si_2O_5)_{p1}(SiO_2)_{q1}$ represents a first silicate layer, p1 and q1 are numbers having values representing a structure of the first silicate layer, and m is a number representing a number of first layers $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the first silicate layers, M' represents bridging groups interposed between adjacent layers of the second silicate layers, M" represents bridging groups interposed between the first layered substructure and the second layered substructure, at least one M, M' or M" including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation; Z is a catalytically active group or a precursor of a catalytically active group; r1 and r2 are numbers having a value representing the number of A cations and/or Z groups needed to render the composition neutral; t is a number having a value representing the state of hydration of the composition; and the A cations, the Z groups and the water molecules occupy non-framework position in the composition as synthesized.

Composites

The present invention also provides a composite including a substrate having a surface including a composition of this invention formed thereon.

The present invention also provides a composite including a substrate having a surface including a composition of this invention formed thereon, where the composite includes a sufficient number of bridging atoms between the surface and the first silicate layer to form a relatively stable and strong porous 3D silicate structure thereon.

The present inventions also provides a chip (an integrated circuit on a semiconductor substrate such as inorganic or organic semiconductor substrates including silicon), having a surface having a bonding layer deposited or formed on the surface, where the layer includes a composition of this invention formed thereon.

The present inventions also provides a chip having a surface having a bonding layer deposited or formed on the surface, where the layer includes a composition of this invention formed thereon, where the chip includes a sufficient number of bridging atoms between the surface of the layer and the composition of this invention to form a relatively stable and strong porous 3D silicate structure thereon.

The bonding layer can include any layer deposited on a semiconductor surface that is capable of having a composition of this invention formed thereon, including, without limitation, molybdenum, tungsten, titanium or other metallic bonding materials or mixtures, alloys or combinations thereof.

Methods for Making

The present invention also provides a method for preparing the compositions of this inventions comprising contacting under hydrothermal crystallization conditions a source of silicon oxide, at least one bridging group precursor or species containing a transition metal M and an alkali metal hydroxide, alkaline earth metal hydroxide or mixtures thereof.

The present invention also provides a method for forming a composition of this inventions on a substrate comprising contacting under hydrothermal crystallization conditions a source of silicon oxide, at least one bridging group precursor or species containing a transition metal M, an alkali metal hydroxide, alkaline earth metal hydroxide or mixtures thereof and a substrate having a surface capable of bridging to a silicate layer.

Catalysts and Methods for Using

The present invention also provides a supported catalyst comprising a catalyst supported on a carrier comprising a composition of this invention.

The present invention also provides a method for transforming a reactant into a product comprising the step of contacting the reactant with a composition of this invention under conditions of temperature, pressure and time to affect the transformation.

The present invention also provides a method for transforming a reactant into a product comprising the step of contacting the reactant with a supported catalyst of this invention under conditions of temperature, pressure and time to affect the transformation.

DESCRIPTION OF THE DRAWINGS

The invention can be better understood with reference to the following detailed description and illustrative drawings in which like elements can be numbered the same:

FIGS. 9a-c depict three 3D representations of a composition of this invention.

DETAILED DESCRIPTION OF THE INVENTION

Figure 1B:
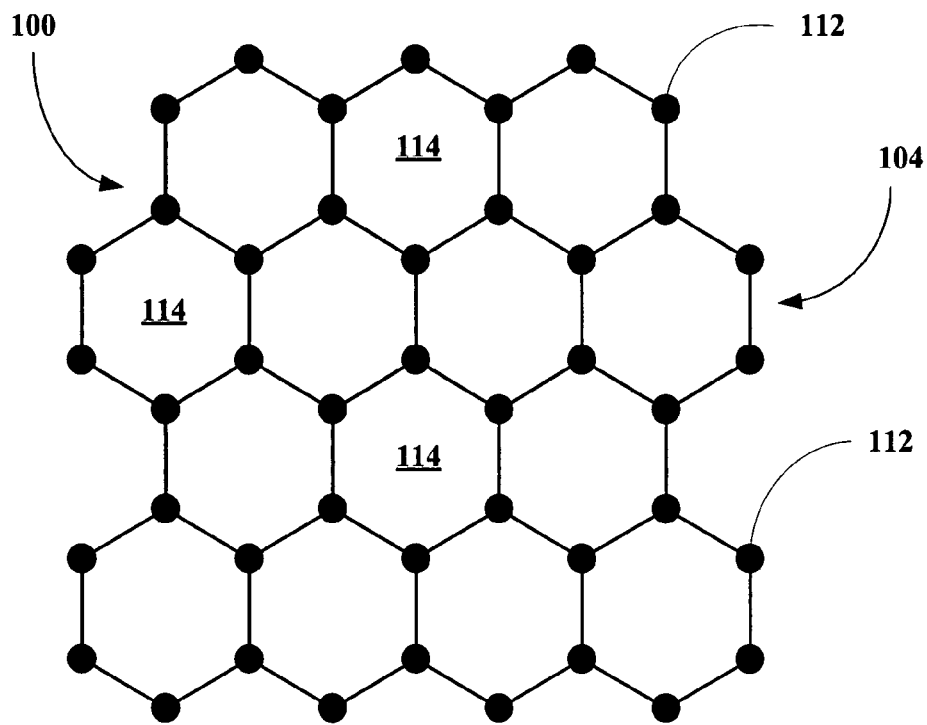
FIGS. 1a and b depict an $6^3$ net and the corresponding silicate sheet.

The inventors have found that silicate layers can be linked together by moieties, at least one of which includes a transition metal to form new 3D molecular structures. The 3D structures of this invention can be prepared having a single silica layer structure or two or more different silica layer structures. Moreover, the 3D structures of this invention can be prepared having a single bridging group or two or more bridging groups where at least one bridging group includes a transition metal atom, where the number of bridging groups are sufficient to render the structure substantially stable. Furthermore, the 3D structures of this invention can be prepared having silica layers that are fused silica layers so that each silica layer can have a greater thickness than for structures of this invention including non-fused silica layers. The 3D structures of this invention can themselves be catalytically active for certain catalytic processes such as oxidative processes under mild to moderate temperature conditions; the structures can be activated to perform other catalytic reaction where the activation converts the transition metal sites into sites active for the given catalytic reaction; or the structure can be contacted with a separate catalytic species for use in any given catalytic process or reaction.

The present invention relates to 3D silicate compositions including a plurality of silicate layers and sufficient bridging groups to form a substantially stable 3D structure at least one bridging group including a transition metal, where the bridging groups are interposed between adjacent silicate layers and share at least one oxygen atom with a silicon atom of each layer. Although the only one bridging group need include a transition metal, it is preferred that all bridging groups include a transition metal.

The present invention broadly relate to 3D structures comprising a plurality of infinite silica layers of $SiO_4$ tetrahedra having repeat units of the general formula $(Si_2O_5)_p(SiO_2)_q$ and bridging groups interconnecting adjacent infinite silicate layers, where at least one bridging group includes a transition metal atom, each tetrahedra shares three or four of its oxygen atoms with other $SiO_4$ tetrahedra, a ratio, z, of the number of tetrahedra that share four corners to the number that share three corners is defined as $q/(2p)$ and p and q are numbers.

General with Formula (I)

The present invention relates to a family of crystalline compositions, referred to herein as MSH-n compositions, represented by general formula (I):

where $(Si_2O_5)_p(SiO_2)_q$ represents a silicate layer; M represents bridging groups interposed between adjacent silicate layers at least one bridging group including a transition metal; A is an alkali or alkaline earth metal cation; p and q are numbers having values representing a structure of the silicate layer; r is a number having a value representing the number of alkali and/or alkaline earth metal cations needed to render the composition neutral; s is a number having a value representing a number of bridging groups; t is a number having a value representing a state of hydration of the composition or the number of water molecules associated with the composition; and the A cations and the water molecules occupy non-framework position in the composition as synthesized.

The present invention relates to a family of crystalline compositions, referred to herein as MSH-n compositions, having the general formula:

where A is an alkali or alkaline earth metal cation and r is a number having a value equal to a number of A cations needed to render the composition neutral; M represents transition metal-containing bridging groups interposed between adjacent silicate layers and s is a number having a value representing the bridging groups M; $(Si_2O_5)_p(SiO_2)_q$ represents a silicate layer and p and q are numbers having values representing a structure of the silica layer; t is a number having a value representing a number of water molecules associated with the composition and the A cations and the water molecules occupy non-framework position in the composition as synthesized.

The present invention relates to a family of crystalline compositions, referred to herein as MSH-n compositions, having the general formula:

where $(Si_2O_5)_p(SiO_2)_q$ represents a silicate layer; M represents bridging groups interposed between adjacent silicate layers, each bridging group including a transition metal; A is an alkali or alkaline earth metal cation; p and q are numbers having values representing a structure of the silicate layer; r is a number having a value representing the number of alkali and/or alkaline earth metal cations needed to render the composition neutral; s is a number having a value representing a number of bridging groups; t is a number having a value representing a state of hydration of the composition or the number of water molecules associated with the composition; the A cations and the water molecules occupy non-framework position in the composition as synthesized; and the composition has a crystal size sufficient to give a distinct X-ray powder diffraction pattern.

General with Formula (II)

The present invention relates to a family of ion-exchanged crystalline compositions having the general formula:

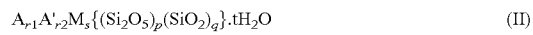

where $(Si_2O_5)_p(SiO_2)_q$ represents a silicate layer; M represents bridging groups interposed between adjacent silicate layers at least one bridging group including a transition metal; A is an alkali or alkaline earth metal cation; A' is an ion exchanged cation selected from the groups consisting of H⁺, the same or different alkali or alkaline earth metal cation, or other ion-exchangeable cations; p and q are numbers having values representing a structure of the silicate layer; r1 and r2 are numbers having a value representing the number of A and A' cations needed to render the composition neutral; s is a number having a value representing a number of bridging groups; t is a number having a value representing a state of hydration of the composition; and the A cations, the A' cations and the water molecules occupy non-framework position in the composition as synthesized.

The present invention relates to a family of ion-exchanged crystalline compositions having the general formula:

$$A_{r1}A'_{r2}M_s\{(Si_2O_5)_p(SiO_2)_q\}.tH_2O \qquad (II)$$

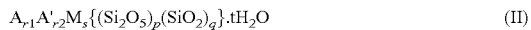

where $(Si_2O_5)_p(SiO_2)_q$ represents a silicate layer; M represents transition metal-containing bridging groups interposed between adjacent silicate layers; A is an alkali or alkaline earth metal cation; A' is an ion-exchanged cation selected from the groups consisting of H⁺, the same or different alkali or alkaline earth metal cation, or other ion-exchangeable cations; p and q are numbers having values representing a structure of the silicate layer, r1 and r2 are numbers having a value representing the number of A and A' cations needed to render the composition neutral; s is a number having a value representing a number of bridging groups; t is a number having a value representing a state of hydration of the composition; and the A cations, the A' cations and the water molecules occupy non-framework position in the composition as synthesized.

The present invention relates to a family of ion-exchanged crystalline compositions having the general formula:

$$A_{r1}A'_{r2}M_s\{(Si_2O_5)_p(SiO_2)_q\}.tH_2O \qquad (II)$$

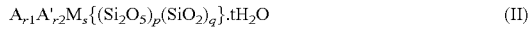

where $(Si_2O_5)_p(SiO_2)_q$ represents a silicate layer; M represents bridging groups interposed between adjacent silicate layers, each bridging group including a transition metal; A is an alkali or alkaline earth metal cation; A' is an ion-exchanged cation selected from the groups consisting of H⁺, the same or different alkali or alkaline earth metal cation, or other ion-exchangeable cations; p and q are numbers having values representing a structure of the silicate layer, p and q are numbers having values representing a structure of the silicate layer; r1 and r2 are numbers having a value representing the number of A and A' cations needed to render the composition neutral; s is a number having a value representing a number of bridging groups; t is a number having a value representing a state of hydration of the composition; the A cations, the A' cations and the water molecules occupy non-framework position in the composition as synthesized; and the composition has crystal size sufficient to give a distinct X-ray powder diffraction pattern.

General with Formula (III)

The present invention relates to a family of catalysts having the general formula:

$$A_{r1}Z_{r2}M_s\{(Si_2O_5)_p(SiO_2)_q\}.tH_2O \qquad (III)$$

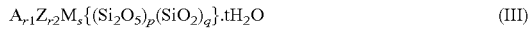

where $(Si_2O_5)_p(SiO_2)_q$ represents a silicate layer; M represents bridging groups interposed between adjacent silicate layers at least one bridging group including a transition metal; A is an alkali or alkaline earth metal cation; Z is a catalytically active group or a precursor of a catalytically active group; p and q are numbers having values representing a structure of the silicate layer, r1 and r2 are numbers having a value representing the number of A cations and/or Z groups needed to render the composition neutral; s is a number having a value representing a number of bridging groups; t is a number having a value representing a state of hydration of the composition; and the A cations, the Z groups and the water molecules occupy non-framework position in the composition as synthesized.

The present invention relates to a family of catalysts having the general formula:

$$A_{r1}Z_{r2}M_s\{(Si_2O_5)_p(SiO_2)_q\}.tH_2O \qquad (III)$$

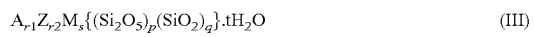

where $(Si_2O_5)_p(SiO_2)_q$ represents a silicate layer; M represents transition metal-containing bridging groups interposed between adjacent silicate layers; A is an alkali or alkaline earth metal cation; Z is a catalytically active group or a precursor of a catalytically active group; p and q are numbers having values representing a structure of the silicate layer; r1 and r2 are numbers having a value representing the number of A cations and/or Z groups needed to render the composition neutral; s is a number having a value representing a number of bridging groups; t is a number having a value representing a state of hydration of the composition; and the A cations, the Z groups and the water molecules occupy non-framework position in the composition as synthesized.

The present invention relates to a family of catalysts having the general formula:

$$A_{r1}Z_{r2}M_s\{(Si_2O_5)_p(SiO_2)_q\}.tH_2O \qquad (III)$$

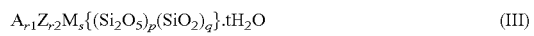

where $(Si_2O_5)_p(SiO_2)_q$ represents a silicate layer; M represents bridging groups interposed between adjacent silicate layers, each bridging group including a transition metal; A is an alkali or alkaline earth metal cation; Z is a catalytically active group or precursor of a catalytically active group, p and q are numbers having values representing a structure of the silicate layer; p and q are numbers having values representing a structure of the silicate layer; r1 and r2 are numbers having a value representing the number of A cations and/or Z groups needed to render the composition neutral; s is a number having a value representing a number of bridging groups; t is a number having a value representing a state of hydration of the composition; the A cations, the Z groups and the water molecules occupy non-framework position in the composition as synthesized; and the composition has crystal size sufficient to give a distinct X-ray powder diffraction pattern.

General with Formula (IV)

The present invention relates to a family of crystalline compositions, referred to herein as MSH-n compositions, having the general formula:

$$[\{(Si_2O_5)_p(SiO_2)_q\}M_s]_nA_r.tH_2O \qquad (IV)$$

where $(Si_2O_5)_p(SiO_2)_q$ represents a silicate layer, p and q are numbers having values representing a structure of the silicate layer and n is a number representing a number of layers and M represents bridging groups interposed between adjacent silicate layers at least one bridging group including a transition metal and s is a number having a value representing a number of bridging groups; A is an alkali or alkaline earth metal cation and r is a number having a value representing the number of alkali and/or alkaline earth metal cations needed to render the composition neutral; t is a number having a value representing the state of hydration of the composition; and the A cations and the water molecules occupy non-framework position in the composition as synthesized.

The present invention relates to a family of crystalline compositions, referred to herein as MSH-n compositions, having the general formula:

where $(Si_2O_5)_p(SiO_2)_q$ represents a silicate layer, p and q are numbers having values representing a structure of the silicate layer and n is a number representing a number of layers and M represents transition metal-containing bridging groups interposed between adjacent silicate layers at least one bridging group including a transition metal and s is a number having a value representing a number of bridging groups; A is an alkali or alkaline earth metal cation and r is a number having a value representing the number of alkali and/or alkaline earth metal cations needed to render the composition neutral; t is a number having a value representing the state of hydration of the composition; and the A cations and the water molecules occupy non-framework position in the composition as synthesized.

The present invention relates to a family of crystalline compositions, referred to herein as MSH-n compositions, having the general formula:

where $(Si_2O_5)_p(SiO_2)_q$ represents a silicate layer, p and q are numbers having values representing a structure of the silicate layer and n is a number representing a number of layers and M represents bridging groups interposed between adjacent silicate layers, each bridging group including a transition metal and s is a number having a value representing a number of bridging groups; A is an alkali or alkaline earth metal cation and r is a number having a value representing the number of alkali and/or alkaline earth metal cations needed to render the composition neutral; t is a number having a value representing the state of hydration of the composition; the A cations and the water molecules occupy non-framework position in the composition as synthesized; and the composition has crystal size sufficient to give a distinct X-ray powder diffraction pattern.

General with Formula (V)

The present invention relates to a family of crystalline compositions, referred to herein as MSH-n compositions having the general formula:

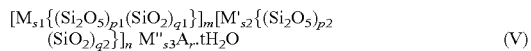

where $(Si_2O_5)_{p1}(SiO_2)_{q1}$ represents a first silicate layer; p1 and q1 are numbers having values representing a structure of the first silicate layer, and m is a number representing a number of first layers, $(Si_2O_5)_{p2}(SiO)_{q2}$ represents a second silicate layer, p2 and q2 are numbers having values representing a structure of the second silicate layer and n is a number representing a number of second layers, M, M' and M'' are the same or different and M represents bridging groups interposed between adjacent layers of the first silicate layers, M' represents bridging groups interposed between adjacent layers of the second silicate layers, M'' represents bridging groups interposed between the first layered substructure and the second layered substructure, at least one M, M' or M'' including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation and r is a number having a value representing the number of alkali and/or alkaline earth metal cations needed to render the composition neutral; t is a number having a value representing the state of hydration of the composition; and the A cations and the water molecules occupy non-framework position in the composition as synthesized.

The present invention relates to a family of crystalline compositions, referred to herein as MSH-n compositions, having the general formula:

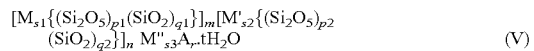

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M'' are the same or different and M represents bridging groups interposed between adjacent layers of the first silicate layers, M' represents bridging groups interposed between adjacent layers of the second silicate layers, M'' represents bridging groups interposed between the first layered substructure and the second layered substructure, each M, M' or M'' group including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation and r is a number having a value representing the number of alkali and/or alkaline earth metal cations needed to render the composition neutral; t is a number having a value representing the state of hydration of the composition; and the A cations and the water molecules occupy non-framework position in the composition as synthesized.

General with Formula (VI)

The present invention relates to a family of ion-exchanged crystalline compositions, referred to herein as MSH-n compositions, having the general formula:

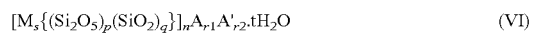

where $(Si_2O_5)_p(SiO_2)_q$ represents a silicate layer, p and q are numbers having values representing a structure of the silicate layer and n is a number representing a number of layers and M represents bridging groups interposed between adjacent layers at least one bridging group including a transition metal and s is a number having a value representing a number of bridging groups; A is an alkali or alkaline earth metal cation; A' is an ion-exchanged cation selected from the groups consisting of $H^+$, the same or different alkali or alkaline earth metal cation, or other ion-exchangeable cations; p and q are numbers having values representing a structure of the silicate layer; r1 and r2 are numbers having a value representing the number of A and A' cations needed to render the composition neutral; t is a number having a value representing the state of hydration of the composition;

and the A cations, the A' cations and the water molecules occupy non-framework position in the composition as synthesized.

The present invention relates to a family of ion-exchanged crystalline compositions, referred to herein as MSH-n compositions, having the general formula:

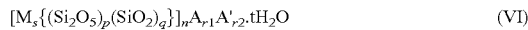

$$[M_s\{(Si_2O_5)_p(SiO_2)_q\}]_n A_{r1} A'_{r2} \cdot t H_2O \tag{VI}$$

where $(Si_2O_5)_p(SiO_2)_q$ represents a silicate layer, p and q are numbers having values representing a structure of the silicate layer and n is a number representing a number of layers and M represents bridging groups interposed between adjacent silicate layers, each bridging group including a transition metal and s is a number having a value representing a number of bridging groups; A is an alkali or alkaline earth metal cation; A' is an ion-exchanged cation selected from the groups consisting of $H^+$, the same or different alkali or alkaline earth metal cation, or other ion-exchangeabl cations; p and q are numbers having values representing a structure of the silicate layer; r1 and r2 are numbers having a value representing the number of A and A' cations needed to render the composition neutral; t is a number having a value representing the state of hydration of the composition; and the A cations, the A' cations and the water molecules occupy non-framework position in the composition as synthesized.

General with Formula (VII)

The present invention relates to a family of catalysts having the general formula:

$$[M_s\{(Si_2O_5)_p(SiO_2)_q\}]_n A_{r1} Z_{r2} \cdot t H_2O \tag{VII}$$

where $(Si_2O_5)_p(SiO_2)_q$ represents a silicate layer, p and q are numbers having values representing a structure of the silicate layer and n is a number representing a number of layers and M represents bridging groups interposed between adjacent silicate layers at least one bridging group including a transition metal and s is a number having a value representing a number of bridging groups; A is an alkali or alkaline earth metal cation; Z is a catalytically active group or a precursor of a catalytically active group; p and q are numbers having values representing a structure of the silicate layer, r1 and r2 are numbers having a value representing the number of A cations and/or Z groups needed to render the composition neutral; t is a number having a value representing the state of hydration of the composition; and the A cations, the Z groups and the water molecules occupy non-framework position in the composition as synthesized.

The present invention relates to a family of catalysts having the general formula:

$$[M_s\{(Si_2O_5)_p(SiO_2)_q\}]_n A_{r1} Z_{r2} \cdot t H_2O \tag{VII}$$

where $(Si_2O_5)_p(SiO_2)_q$ represents a silicate layer, p and q are numbers having values representing a structure of the silicate layer and n is a number representing a number of layers and M represents bridging groups interposed between adjacent silicate layers, each bridging group including a transition metal and s is a number having a value representing a number of bridging groups; A is an alkali or alkaline earth metal cation; Z is a catalytically active group or a precursor of a catalytically active group; p and q are numbers having values representing a structure of the silicate layer; r1 and r2 are numbers having a value representing the number of A cations and/or Z groups needed to render the composition neutral; t is a number having a value representing the state of hydration of the composition; and the A cations, the Z groups and the water moleucules occupy non-framework position in the composition as synthesized.

General with Formula (VIII)

The present invention relates to a family of ion-exchanged crystalline compositions, referred to herein as MSH-n compositions, having the general formula:

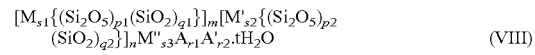

$$[M_{s1}\{(Si_2O_5)_{p1}(SiO_2)_{q1}\}]_m [M'_{s2}\{(Si_2O_5)_{p2}(SiO_2)_{q2}\}]_n M''_{s3} A_{r1} A'_{r2} \cdot t H_2O \tag{VIII}$$

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the first silicate layers, M' represents bridging groups interposed between adjacent layers of the second silicate layers, M" represents bridging groups interposed between the first layered substructure and the second layered substructure, at least one M, M' or M" including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation; A' is an ion-exchanged cation selected from the groups consisting of $H^+$, the same or different alkali or alkaline earth metal cation, or other ion-exchangeable cations; p and q are numbers having values representing a structure of the silicate layer, r1 and r2 are numbers having a value representing the number of A cations and A' cations needed to render the composition neutral; t is a number having a value representing the state of hydration of the composition; and the A cations, the A' cations and the water molecules occupy non-framework position in the composition as synthesized.

The present invention relates to a family of ion-exchanged crystalline compositions, referred to herein as MSH-n compositions, having the general formula:

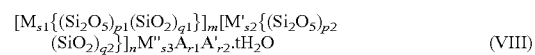

$$[M_{s1}\{(Si_2O_5)_{p1}(SiO_2)_{q1}\}]_m [M'_{s2}\{(Si_2O_5)_{p2}(SiO_2)_{q2}\}]_n M''_{s3} A_{r1} A'_{r2} \cdot t H_2O \tag{VIII}$$

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the first silicate layers, M' represents bridging groups interposed between adjacent layers of the second silicate layers, M" represents bridging groups interposed between the first layered substructure and the second layered substructure, each M, M' or M" group including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation; A' is an ion-exchanged cation selected from the groups consisting of H$^+$, the same or different alkali or alkaline earth metal cation, or other ion-exchangeable cations; p and q are numbers having values representing a structure of the silicate layer; r1 and r2 are numbers having a value representing the number of A and A' cations needed to render the composition neutral; t is a number having a value representing the state of hydration of the composition; and the A cations, A' cations and the water molecules occupy non-framework position in the composition as synthesized.

General with Formula (IX)

The present invention relates to a family of catalysts having the general formula:

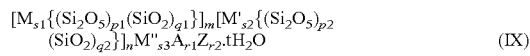

(IX)

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the first silicate layers, M' represents bridging groups interposed between adjacent layers of the second silicate layers, M" represents bridging groups interposed between the first layered substructure and the second layered substructure, at least one M, M' or M" including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation; Z is a catalytically active group or a precursor of a catalytically active group; p and q are numbers having values representing a structure of the silicate layer; r1 and r2 are numbers having a value representing the number of A cations and/or Z groups needed to render the composition neutral; t is a number having a value representing the state of hydration of the composition; and the A cations, the Z groups and the water molecules occupy non-framework position in the composition as synthesized.

The present invention relates to a family of catalysts having the general formula:

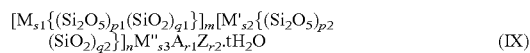

(IX)

where $(Si_2O_5)_{p1}(SiO_2)_{q1}$ represents a first silicate layer, p1 and q1 are numbers having values representing a structure of the first silicate layer, and m is a number representing a number of first layers, $(Si_2O_5)_{p2}(SiO_2)_{q2}$ represents a second silicate layer, p2 and q2 are numbers having values representing a structure of the second silicate layer and n is a number representing a number of second layers, M, M' and M" are the same or different and M represents bridging groups interposed between adjacent layers of the first silicate layers, M' represents bridging groups interposed between adjacent layers of the second silicate layers, M" represents bridging groups interposed between the first layered substructure and the second layered substructure, each M, M' or M" group including a transition metal and s1 is a number having a value representing a number of bridging groups between adjacent layers of the first silicate layers, s2 is a number having a value representing a number of bridging groups between adjacent layers of the second silicate layers and s3 is a number having a value representing a number of bridging groups between the two substructures; and A is an alkali or alkaline earth metal cation Z is a catalytically active group or a precursor of a catalytically active group; p and q are numbers having values representing a structure of the silicate layer; r1 and r2 are numbers having a value representing the number of A cations and/or Z groups needed to render the composition neutral; t is a number having a value representing the state of hydration of the composition; and the A cations, Z groups and the water molecules occupy non-framework position in the composition as synthesized.

Suitable ion-exchangeable cation include, without limitation, any cation that can be ion-exchanged with a non-framework cation of the compositions of this invention. Non-limiting exemplary examples include organic and inorganic cations. Organic cations including, without limitation, stabilized methane cations such as 2,4,6-triphenylpyrillium hydroxide or the like, tetrahydrocarbyl ammonium or phosphonium hydroxides, bromides, iodides, chloride, perchlorates, or the like, where the hydrocarbyl groups can be alkyl groups, aryl groups, alka-aryl groups, ara-alkyl groups, or mixture or combinations thereof, or the like. Inorganic cations include, without limitation, ammonium, phosphonium, H$^+$, alkali metals ions, alkaline earth metal ions, transition metal ions, and rare earth metal ions or the like.

Composites

The present invention also relates to a composite including a substrate having a surface including a composition of this invention formed thereon.

The present invention also relates to a composite including a substrate having a surface composed of a crystalline material having regularly positions surface silicate tetrahedra with at least one SiOH or similar group and a composition of this invention formed thereon where bridging groups bridge the crystalline material and the composition of this invention.

The present invention also relates to a composite including a substrate having a surface including a composition of this invention formed thereon, where the composite includes a sufficient number of bridging atoms between the surface and the first silicate layer to form a relatively stable and strong porous 3D silicate structure thereon.

The present inventions also relates to a chip having a surface having a crystalline siliceous material deposited or formed on the surface, where the material includes a composition of this invention formed thereon.

The present inventions also relates to a chip having a surface having a crystalline siliceous layer deposited or formed on the surface, where the layer includes a composition of this invention formed thereon, where the chip includes a sufficient number of bridging atoms between the surface of the layer and the composition of this invention to form a relatively stable and strong porous 3D silicate structure thereon.

The present invention also relates of a chip based molecular sensor, where the chip includes a crystalline siliceous layer deposited or formed on a surface having a composition of this invention formed thereon, where an output state of the chip changes when a molecule occupies open sites in the composition.

Methods for Making

The present invention also relates to a method for preparing the compositions of this inventions comprising contacting under hydrothermal crystalline conditions a source of silicon oxide, at least one bridging group precursor or species containing a transition metal M and an alkali metal hydroxide, alkaline earth metal hydroxide or mixtures thereof.

The present invention also relates to a method for forming a compositions of this inventions on a substrate comprising contacting under hydrothermal crystallization conditions a source of silicon oxide, at least one bridging group precursor or species containing a transition metal M, an alkali metal hydroxide, alkaline earth metal hydroxide or mixtures thereof and a substrate having a surface capable of bridging to a silicate layer.

Catalysts, Methods for Making the Catalyst and Methods for Their Use

The present invention also relates to a method for transforming a reactant into a product comprising the step of contacting the reactant with a composition of this invention under conditions of temperature, pressure and time to affect the transformation.

The present invention also relates to a method for forming a catalytically active composition of this invention including the step of activating the composition with an activating agent.

The present invention also relates to a method for transforming a reactant into a product comprising the step of contacting the reactant with a catalytically activated composition of this invention under conditions of temperature, pressure and time to affect the transformation.

The present invention also relates to a supported catalyst comprising a catalyst supported on a carrier comprising a composition of this invention.

The present invention also relates to a method for transforming a reactant into a product comprising the step of contacting the reactant with a supported catalyst of this invention under conditions of temperature, pressure and time to affect the transformation.

General Structural Details and Characteristics

In particular, the present invention relates to 3D silicate layered structure of the general formula $A_rM_s\{(Si_2O_5)_p(SiO_2)_q$, where A is a cation, M is a bridging group including a transition metal atom, $(Si_2O_5)_p(SiO_2)_q$ is a representation of a silicate layer, r is a number sufficient to charge balance a given structure of the general formula, s is a number representing the number of bridging groups, p and q are numbers representing the number of three and four coordinate $SiO_4$ tetrahedra in the layer. The M bridging group can be a cation, where the cation can be simple or complex. The number of bridges per interconnecting adjacent layers is defined by k. The MSH-n framework structures that result from bridging the silicate layers with k M cations can be neutral or negatively charged. When the framework is negatively charged, then the composition will include sufficient A cations to yield a charge balanced composition. The framework structures may contain additional molecules such as water or lower molecular weight organics that may be removed by heating, vacuum drying, combination thereof or other well known techniques to form anhydrous compositions.

The MSN-n composition of this invention comprise stacked silica layers held together with bridging groups. These silica layers can be the same or different depending on the nature of the composition being prepared. Besides compositions where the silica layers are different, the silica layers can comprises fused silica structures, which extends the z dimension of the silica layers. Thus, the compositions of the present invention also comprise structures including a single silica layer, a fused silica layers, a plurality of single silica layers, a plurality of fused silica layers, or a mixture of single and fused silica layers held together by bridging groups.

The MSN-n composition of this invention comprise stacked silica layers held together with bridging groups, where the number of bridging groups are sufficient to render the structure substantially stable. The term substantially stable for use in this invention means that the structure—the unit cell structure—changes less than 10% after preparation at temperatures at or below about 700° C., preferably at temperatures at or below about 600° C., particularly, at temperature at or below about 500° C. and especially at temperatures at or below about 400° C. When the composition of this invention are used as catalysts or catalyst supports, then the catalyst should be regenerated, if needed, at the preferred temperature ranges set forth above for maintaining substantial stability. At temperatures above about 700° C., the structure begin to rearrange and collapse.

The MSN-n composition of this invention, which comprise stacked silica layers held together with bridging groups, where the number of bridging groups are sufficient to render the structure substantially stable, can have surface areas that range from low surface area materials having a surface area of about 10 m$^2$/g to high surface area materials having a surface area of about 700 m$^2$/g. Thus, the compositions of this invention can be prepared to achieve a surface area between about 10 m$^2$/g and about 700 m$^2$/g. The preferred range is between about 20 m$^2$/g and about 600 m$^2$/g, with a particularly preferred range between about 20 m$^2$/g and about 500 m$^2$/g.

Figure 1A:
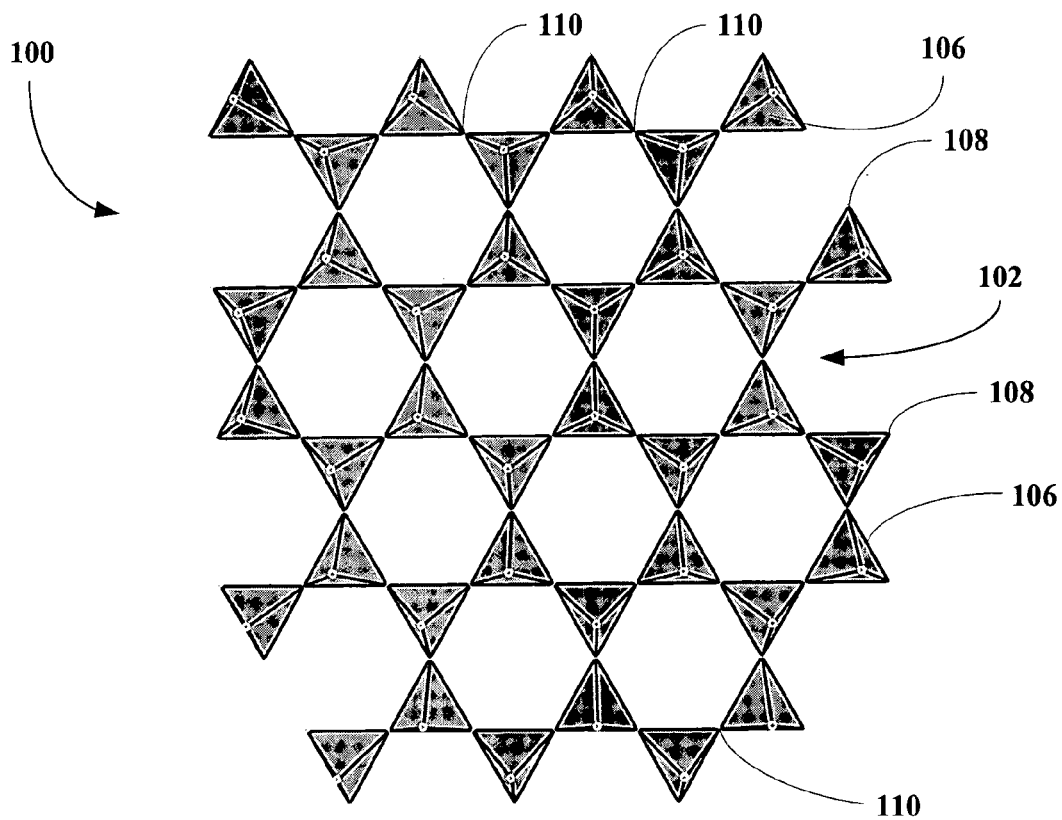

The MSH-n compositions can be described in terms of interconnected 2D silicate layers, where the Si sites can be presented either a tetrahedra or points. Referring now to FIGS. 1a and b, a silicate layer 100 is shown in a tetrahedral representation 102 and a simpler net representation 104, respectively. The layer 100 corresponds to a silicate layer of the general formula $(Si_2O_5)_p(SiO_2)_q$ with q=0 so that all of the $SiO_4$ tetrahedra share three corners (i.e., all of the $SiO_4$ tetrahedra share three of their oxygen atoms with neighboring Si tetrahedra). The tetrahedral representation 102 is composed of Si tetrahedra 106 where vertices 108 of each tetrahedron 106 represents an oxygen atom with a silicon atom located in the center of each tetrahedron 106 (not shown). Points of contact 110 between two or more tetrahedra represent Si—O—Si bonds. In the net representation 104 of FIG. 1b, each tetrahedron 106 of FIG. 1a is replaced by a point 112. The net representation 104 can then be described as composed of polygons 114 (in this case hexagons) that 'tile' the layer 100. At each point 112 in the tiling pattern 104, three polygons 114 meet.

The relationships between the types of polygons (e.g., four-sided, six-sided, . . . , k-sided polygons) that can tile a three connected net is given by equation (1):

$$\sum_n n\phi_n = 6 \tag{1}$$

where $\phi_n$ is the fraction of polygons that have n sides and n is the number of sides in each polygon. The compositions of this invention are characterized by 3<n<18, with 3<n<12 being preferred.

In other compositions of the present invention, q is not equal to zero. In such cases, the tiling pattern is given by equation (2):

$$\sum_n n\phi_n = 2(3+4z)/(1+2z) \qquad (2)$$

where z is given by q/(2p).

For z=½, then equation (2) becomes equation (2a)

$$\sum_n n\phi_n = 5 \qquad (2a)$$

Figure 2B:
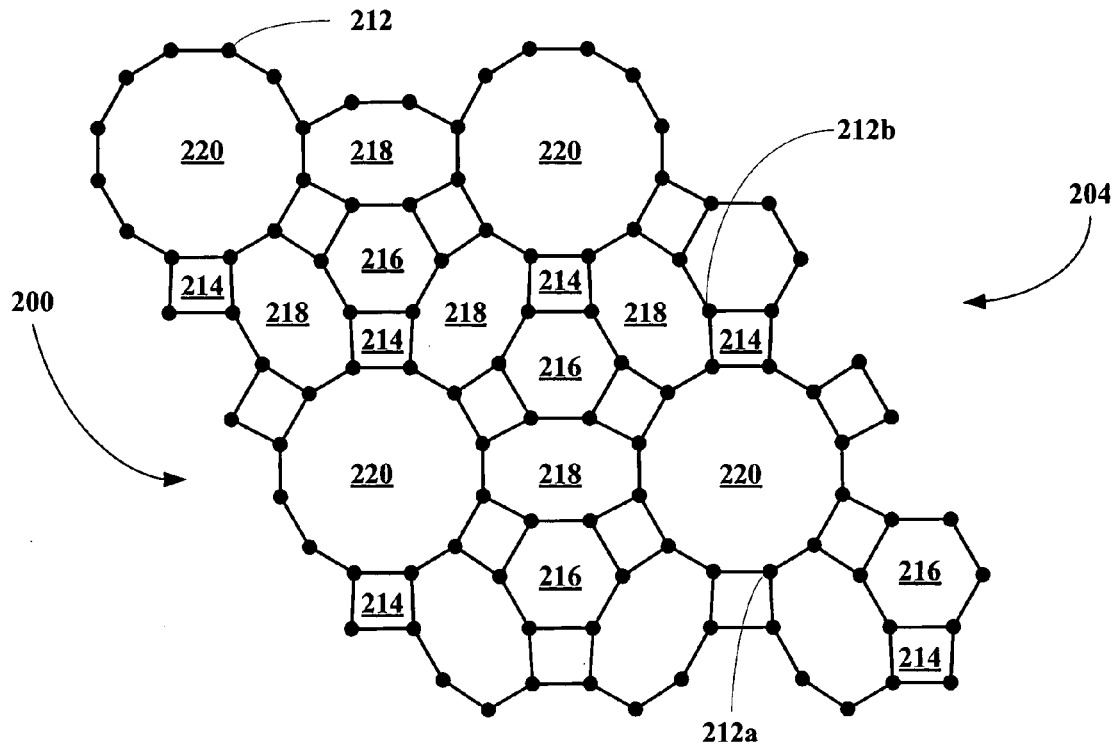
FIGS. 2a and b depict a (4.6.8) (4.8.12) net and the corresponding silicate sheet.
Figure 2A:
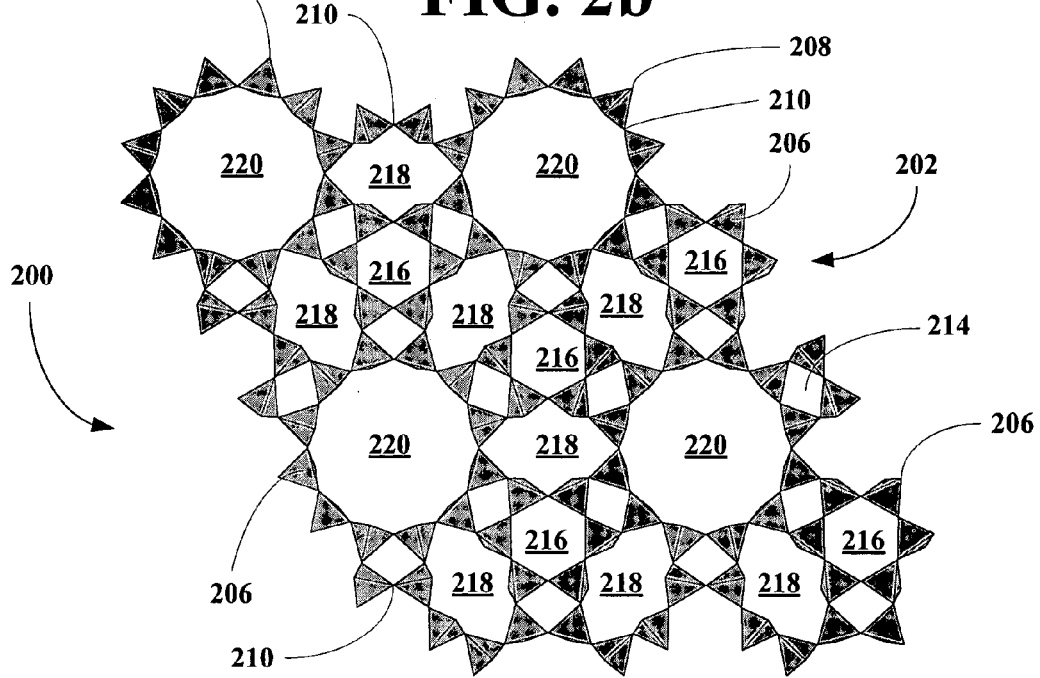

FIGS. 2a&b and 3a&b show examples of two dimensional nets where z=0 and z=½ in the tetrahedral representations and the point representations. Looking at FIGS. 2a and b, a silicate layer 200 is shown in a tetrahedral representation 202 and a simpler net representation 204, respectively. The layer 200 corresponds to a silicate layer of the general formula $(Si_2O_5)_p(SiO_2)_q$ with z=0. The tetrahedral representation 202 is composed of Si tetrahedra 206 where vertices 208 of each tetrahedron 206 represents an oxygen atom with a silicon atom located in the center of each tetrahedron 206 (not shown). Points of contact 210 between two or more tetrahedra represent Si—O—Si bonds. In the net representation 204 of FIG. 2b, each tetrahedron 206 of FIG. 2a is replaced by a point 212. The net representation 204 can then be described as composed of four different polygons: quadrilaterals 214, hexagons 216, octagons 218 and dodecagons 220 that tile the layer 200. In the tiling pattern 204, two different types of points 212a-b exist, each point 212 depicting a shared vertex with three of the four different polygons 214-20. The 212a type points are a shared vertices between a quadrilateral 214, a octagon 216 and a dodecagon 220; and the 212b type points are a shared vertices between a quadrilateral 214, a hexagon 216 and a octagon 218.

Figure 3B:
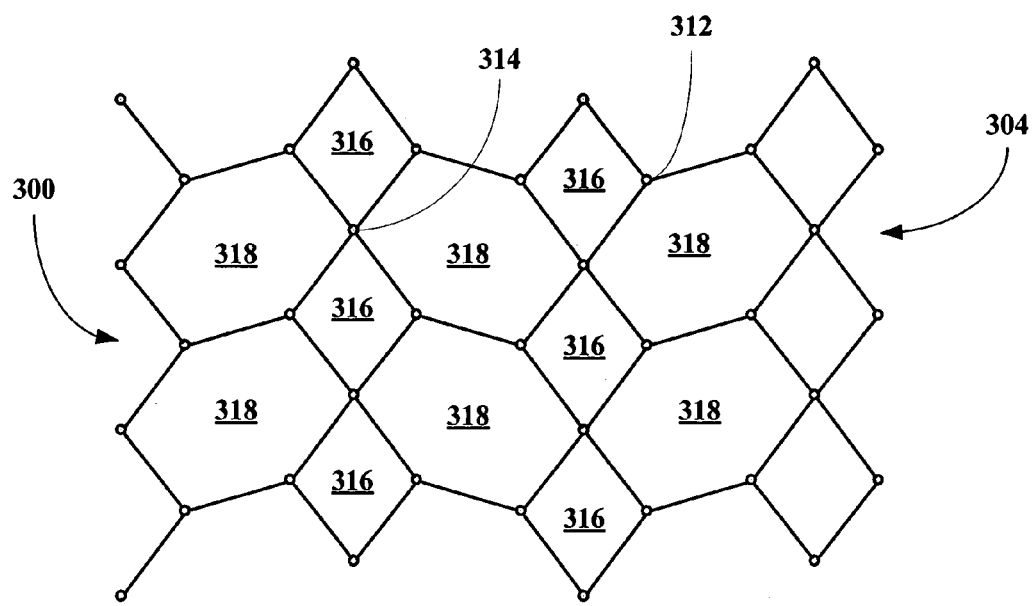
FIGS. 3a and b depict a $(4.6^2)_2(4^2.6^2)$ net and the corresponding silicate sheet.
Figure 3A:
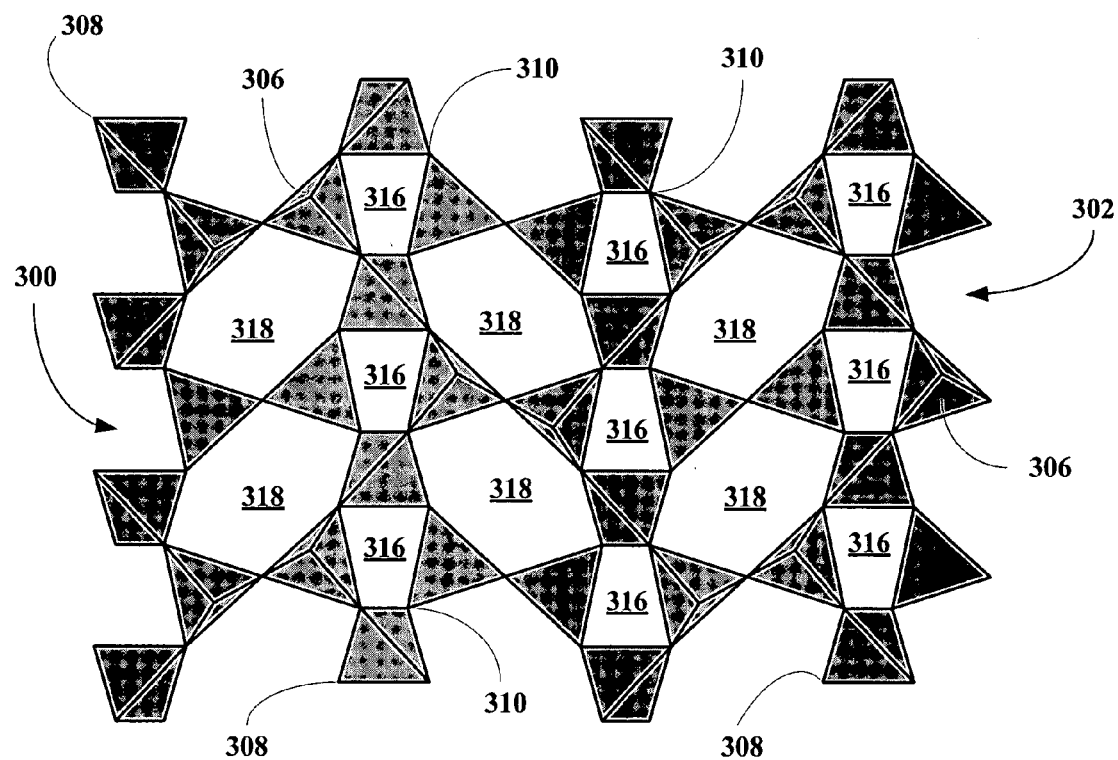

Looking at FIGS. 3a and b, a silicate layer 300 is shown in a tetrahedral representation 302 and a simpler net representation 304, respectively. The layer 300 corresponds to a silicate layer of the general formula $(Si_2O_5)_p(SiO_2)_q$ with z=q/(2p)=½. The tetrahedral representation 302 is composed of Si tetrahedra 306 where vertices 308 of each tetrahedron 306 represents an oxygen atom with a silicon atom located in the center of each tetrahedron 306 (not shown). Points of contact 310 between two or more tetrahedra represent Si—O—Si bonds. In the net representation 304 of FIG. 3b, each tetrahedron 306 of FIG. 3a is replaced by two types of points 312 and 314. The net representation 304 can then be described as composed of two different polygons: quadrilaterals 316 and hexagons 318 that tile the layer 304. In the tiling pattern 304, the points 312 depict vertices shared by one quadrilateral 316 and two hexagons 318; while the points 314 depict vertices shared by two quadrilaterals 316 and two hexagons 318.

Figure 4A:
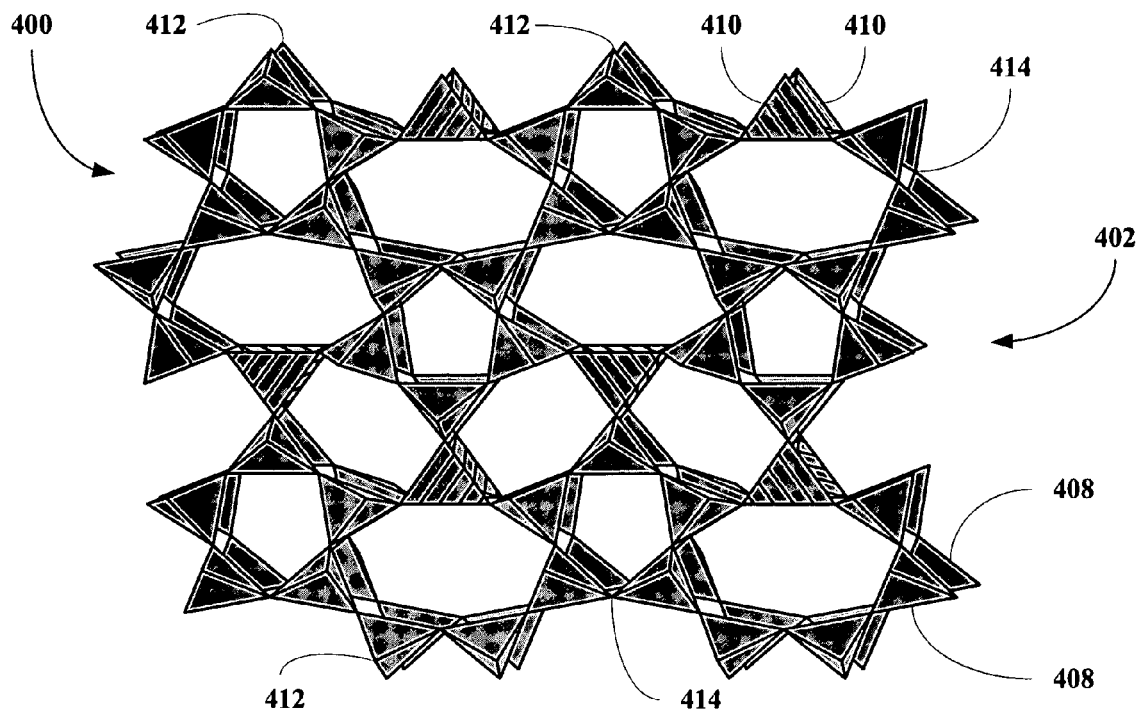
FIGS. 4a-d depict a fused sheet made of two linked $(5.6^2)(5.6.7)_4(5.7^2)_4(6^2.7)$ silicate sheets.
Figure 4B:
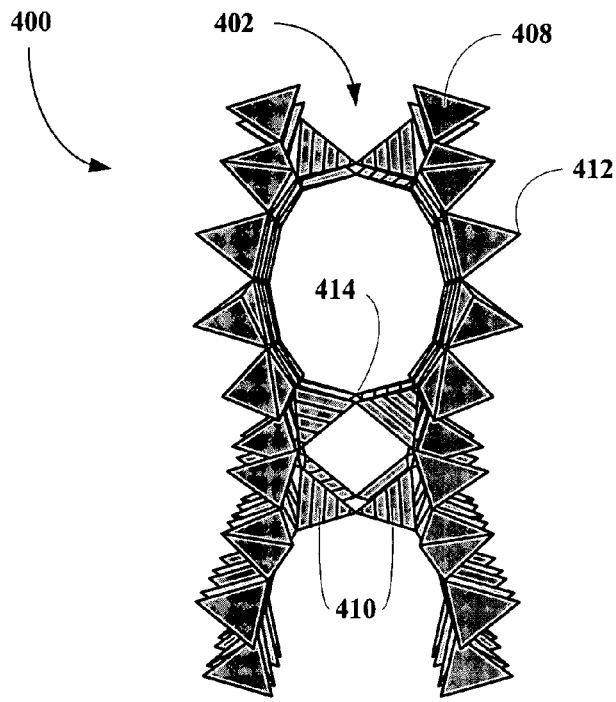

Referring now to FIGS. 4a-d, a double silicate layer 400 is shown. Looking at FIGS. 4a&b, two tetrahedral representations 402 of layer 400 is shown, where FIG. 4a is a plan view and FIG. 4b is a side view. The double layer 400 is composed of two single layers shown in a tetrahedral representation 404 and a simpler net representation 406 in FIGS. 4c&d, respectively.

Looking at FIGS. 4a&b, the layer 400 corresponds to a silicate double (fused) layer of the general formula $(Si_2O_5)_p(SiO_2)_q$ with z=q/(2p)=²⁄₁₀ or ⅕. The tetrahedral representation 402 is composed of single layer Si tetrahedra 408 and linking Si tetrahedra 410, where vertices 412 of each tetrahedron 408 or 410 represents an oxygen atom with a silicon atom located in the center of each tetrahedron 408 or 410 (not shown). Points of contact 414 between two or more tetrahedra represent Si—O—Si bonds.

Figure 4D:
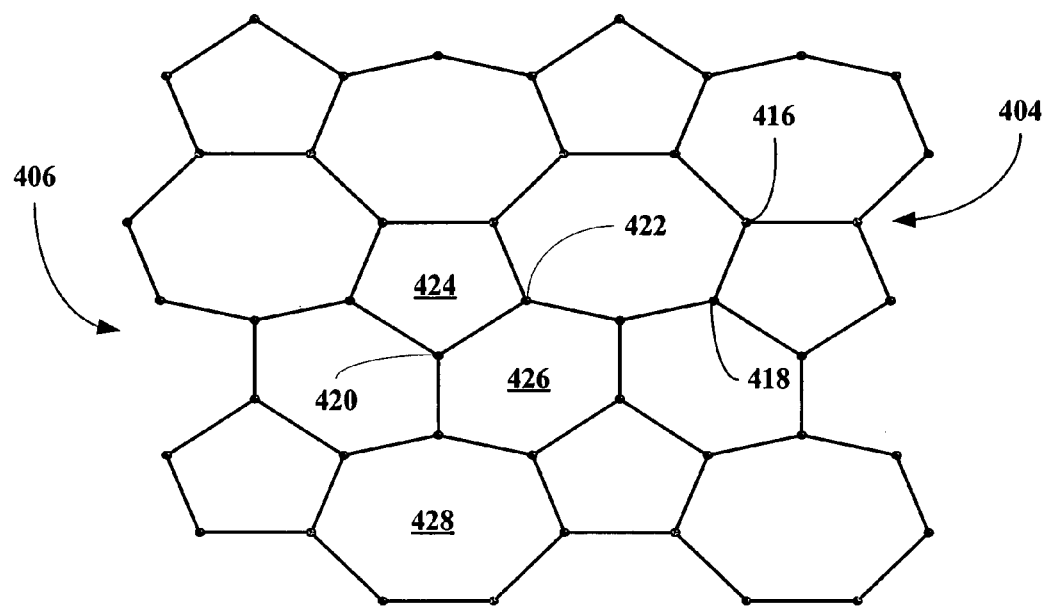
Figure 4C:
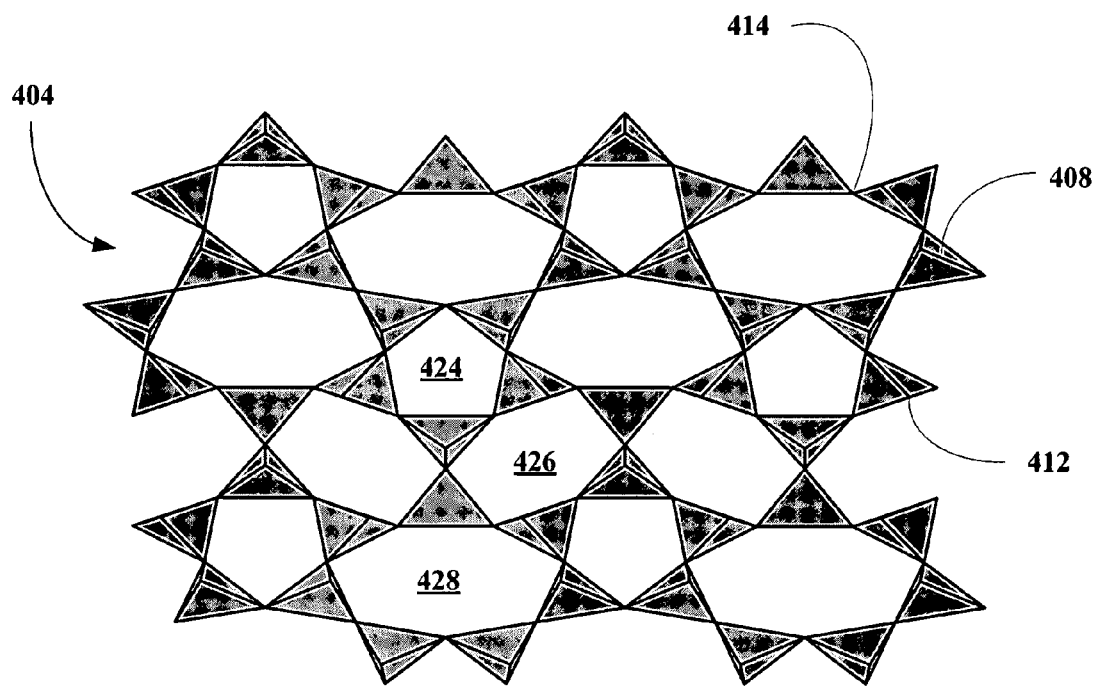

Looking at FIGS. 4c&d, the single layer tetrahedral representation 404 and the net representation 406 are shown, where each tetrahedron 408 of FIG. 4c is replaced by four different types of points 416, 418, 420, and 422 in FIG. 4d. The net representation 406 is composed of three different polygons: pentagons 424, hexagons 426 and heptagons 428 that tile the layer 406. In the tiling pattern 406, the points 416 depict vertices shared by two heptagons 428 and a pentagon 424; the points 418 depict vertices shared by a pentagon 424, a hexagon 426 and a heptagon 428; the points 420 depict vertices shared by a polygon 424 and two hexagons 426; while the points 422 depict vertices shared by two hexagons 426 and a heptagon 428.

Although, the nets shown in FIGS. 1-4 are shown to be flat (planar), the silicate layers need not in general be flat or planar provided that they satisfy the topological requirements given above. Moreover, more than one arrangement of silicon atoms may exist for a given set of $\phi_n$s. Furthermore, as shown in FIGS. 4a-d, the silicate layer can be composed of linked silica layers increasing the z dimension of the silicate layers making up the compositions of this invention.

The compositions of the present invention require that the silicate layers contain a sufficient number of silicon oxygen tetrahedra with unshared oxygen atoms that are available to form connections with adjacent layers or appropriate substrate surfaces through the bridging groups M, thereby forming three-dimensional frameworks. The bridging groups M are generally cations and are generally coordinated to two or more, preferably three or more and particularly four or more unshared oxygen atoms from two adjacent silicate layers, i.e., each M cation coordinates to or bonds to each silicate layer through available unshared silicate layer oxygen atoms which are each coordinated to only one silicon atom. The bridging groups may also be coordinated to additional species including, but not limited to, O, OH⁻, F⁻, $H_2O$, $NH_3$, or the like mixtures or combinations thereof.

Suitable bridging groups include, without limitation, any compound (neutral or charged) containing at least one transition metal atom capable of occupying bridging sites between adjacent silicate layers to form stable 3D structures. Exemplary examples of such bridging groups include, without limitation, $VO^{2+}$, $VO(H_2O)^{2+}$, $Cu(H_2O)_2^{2+}$, $ZrF_2^{2+}$, $NbOF^{2+}$, $Co(H_2O)_2^{2+}$, $UO_2^{2+}$ or other similar transition atoms capable of occupying bridging sites between adjacent silicate layers. For the purpose of this application, the term transition metal refers to all metal atoms in the Periodic Table of Elements from Sc to Zn, Y to Cd and La to Hg including rare earths and actinides metals.

The maximum number of bridging groups occurs when s=p=2, but in the compositions of this invention the number is generally less than 2, that is s<p=2. Values of s generally lie in the range between about ⅛ and about 2, preferably, between about ¼ and about 1, and particularly, between about ⅓ and about ½. The number n and m in the formulas shown above can range between about 5 and about 1,000,000, with a range between 10 and 500,000 being preferred, and a range between about 100 and about 100,000 being particularly preferred.

The combination of bridging groups comprising M cations and negatively charged silicate layers generally yields frameworks that are neutral or negatively charged depending on the combinational charge comprising the combined charges on all M cations and on the silicate layer. For example, when the charge on M is $2^+$, $s=2$, $p=2$ and $q=0$, the framework $M_2\{(Si_2O_5)_2\}$ is neutral. More generally, the framework given by $M_s\{(Si_2O_5)_p(SiO_2)_q\}$ is negatively charged. The negatively charged framework is charge compensated by the presence of the additional non-framework cations A that may be hydrated or solvated. Preferred A cations are selected from the group consisting of alkali and alkaline earth cations and mixtures and combination thereof. Particularly preferred A cations are Na, K, Rb, Cs, Ca, Sr, Ba and mixtures and combinations thereof.

In addition, the present invention relates to methods for synthesizing the compositions of this invention by contacting, under hydrothermal crystallization conditions, a source of silicon oxide, the bridging group M and an alkali metal hydroxide, alkaline earth metal hydroxide or a mixture or combination thereof. Generally, water is the only solvent; however, in some reactions, the addition of a co-solvent such as ethylene glycol maybe advantageous to promote crystallization.

The synthetic reactions are generally carried out at pH values in the range between about 7 and about 14, preferably between about 8 and about 14, particularly between about 8 and about 13 and especially between about 9 and about 13. Additional species such as organic bases, for example, methylamine, may be added to adjust the pH of the reactant mixture and also to promote crystallization. The synthetic reactions are carried out under conditions of temperature and pressure and reaction time sufficient to form crystals of the compositions of the invention. Generally, the synthetic temperature range is between about 100° C. and about 300° C., preferably, between about 150° C. and about 250° C., and particularly between about 175° C. and about 225° C.

The compounds of the present invention as prepared contain water molecules in the internal structure. These water molecules may be removed by heating to elevated temperatures (preferably less than about 400° C.) or by heating under vacuum. The water molecules can subsequently be reabsorbed quantitatively or replaced by other molecular species. The compounds of the present invention also contain alkali metal cations that can be replaced by ion exchange reactions with other metal cations to give compositions of the invention wherein $A_{r1}M_s\{(Si_2O_5)_p(SiO_2)_q\}]\cdot tH_2O$, $A_r$ is replaced all or in part by $A'_{r/n}$ where A' is another metal cation and n is its formal charge to form a composition of the following formula $A_{r1}A'_{r2}[M_s\{(Si_2O_5)_p(SiO_2)_q\}]\cdot tH_2O$.

Figure 5A:
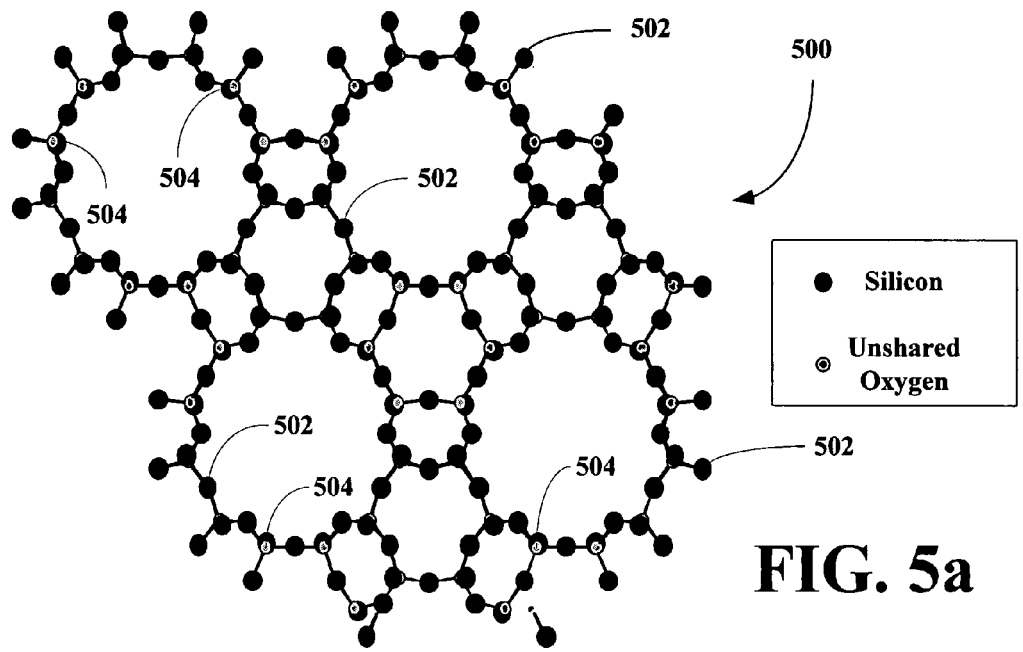
FIGS. 5a, b and c depict the formation of a bridged silicate layered structure of this invention derived from a 4.6.12 silicate layer by reacting the layer with a bridging group.
Figure 5B:
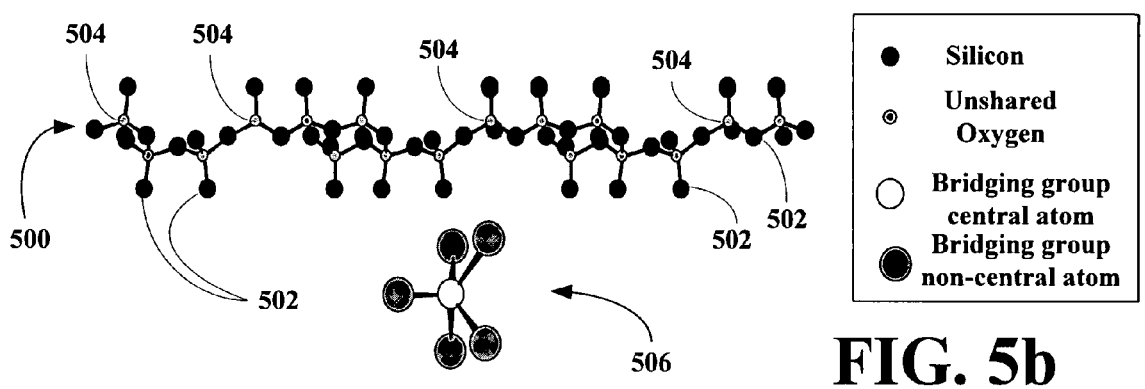
Figure 5C:
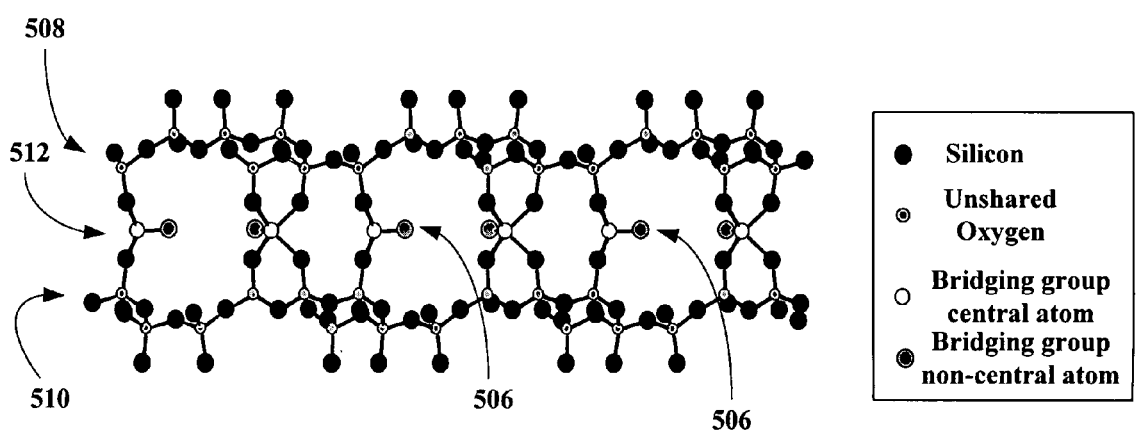

Referring now to FIGS. 5a-c, a schematic diagram of the formation of a composition of this invention is shown. Looking at FIG. 5a, a silicate layer 500 is shown in a top view to include silicon atoms 502 in dark black and unshared oxygen atoms 504 in grey dots. Looking at FIG. 5b, the layer 500 is shown in an edge-on view with a bridging group 506 located below the layer 500. Looking at FIG. 5c, two silicate layer 508 and 510 are shown connected or bridged together by the bridging groups 506 in a bridging format 512. The format 512 shows the bridging group connected to two oxygen atoms 504 on each layer 508 and 510.

Figure 6:
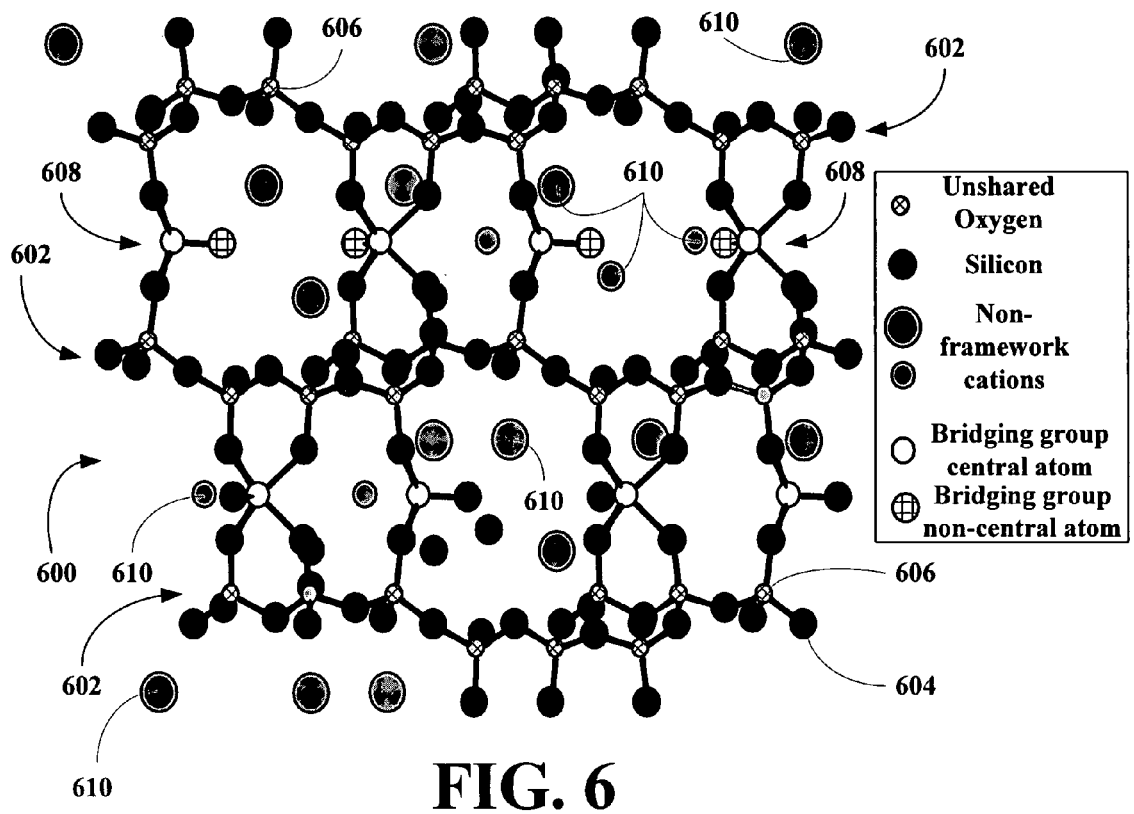
FIG. 6 depicts a bridged silicate layered structure showing locations of non-framework cations.

Referring now to FIG. 6, a portion of a bridged silicate layered structure 600 including three silicate layers 602 showing silicon atoms 604 and unshared oxygen atoms 606; bridging group 608; and non-framework cations 610.

Figure 7:
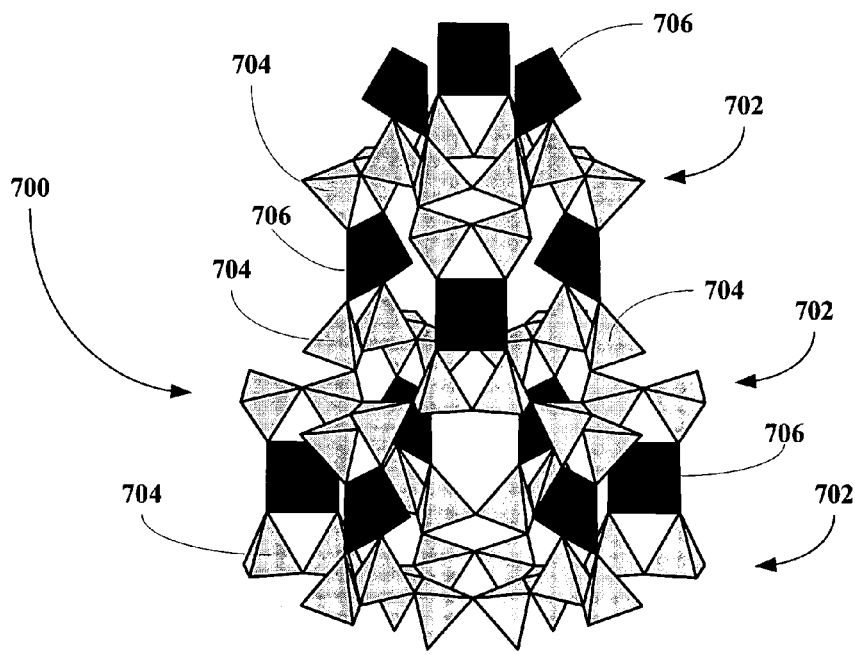
FIG. 7 depicts an environment of a large central cavity in a bridged silicate layered structure of this invention.

Referring now to FIG. 7, a portion of a bridged silicate layered structure 700 including three silicate layers 702 showing silicon atom tetrahedra 704 in grey and bridging group geometric solids 706 in black.

The present invention also relates to the use of the compositions of the present invention to catalyze chemical transformations where the process involves contacting a compound with a transformation compound in the presence of the composition of this invention under conditions appropriate for accomplishing the transformation. If the transformation is oxidation of an organic compounds such as a aldehyde to an acid, an alkene to a ketone or aldehyde or the like, then the process involves contacting the organic reagent with an oxidizing agent in the presence of a composition of this invention under oxidation conditions—elevated temperatures and/or pressures for a time sufficient of achieve a desire conversion.

The present invention also relates to activation of the compositions of the present invention, where the activation reaction can include oxygen pretreatment at elevated temperatures, but generally less than about 400° C. or reductive pretreatment such as treating with an organo-aluminum species. After activation, the process involves a given chemical transformation involving contacting one or more organic feedstocks in the presence of the activated composition of the present invention under reaction conditions sufficient to achieve a desired degree of transformation conditions.

The present invention also relates to the preparation of new catalysts comprising a carrier including a composition of this invention and one or more catalytic agents or precursors to catalytic agents. If the compositions of this invention are to comprise the carrier, then the preparation process involve contacting a catalyst or catalyst precursor with a composition of this invention. For example, if the catalyst is a polymerization catalyst such as a Ziegler catalyst, Natta catalyst, Ziegler-Natta catalyst, a metallocene or the like, the catalyst or catalyst precursor is simply brought into contact with the composition of this invention under conditions to maintain catalyst active, if the catalytic species is an active catalytic species. Once prepare, a standard polymerization process can be used where the supported catalyst is contacted with one or more polymerizable monomers under polymerization conditions to form a given oligomer or polymer product.

Suitable catalyst and catalyst precursors including, without limitation, any catalyst composition capable of being supported on a support and any catalyst precursor capable of being supported on a support and capable of post support activation. Examples of suitable catalyst include, without limitation, polymerization catalysts, oxidation catalysts, hydrogenation catalysts, hydrodesulfurization catalysts, dehydrogenation catalysts, alkylation catalyst, aromatic alkylation catalyst, isomerization catalyst, hydroisomerization catalysts, of the like. It should be recognized that the compositions of this invention can have inherent catalytic activity or can be activated into catalytically active agents especially for oxidation reactions catalyzed by vanadium catalyst. Additionally, the catalyst composition of this invention can include binders, promoters, co-catalysts, multiple catalysts, co-carriers, monolith supports, or the like.

If the carrier includes a monolith upon which a composition of this invention is deposited or made thereon, then either the monolith is contacted with a slurry comprising the composition of this invention generally in water or another solvent followed by drying to form a monolith with a composition of the present invention deposited thereon, or the monolith is contacted with a preparation mixture for making the composition of this invention under hydrothermal conditions to form a monolith with a composition of the present invention formed on the surface. Once prepare, the carrier can be brought in contact with a catalyst as described above.

The compositions of present invention are ideally suited as supports for catalysts used in catalytic converts.

The compositions of present invention are prepared by hydrothermal crystallization of a reaction mixture prepared by combining a reactive source of the bridging metal M species, silicon, at least one alkali metal, and water. The alkali metal acts as a templating agent. The sources of silica include colloidal silica, fumed silica, siliconalkoxides and sodium silicate. Alkali sources include potassium hydroxide, sodium hydroxide, rubidium hydroxide, cesium hydroxide, sodium carbonate, potassium carbonate, rubidium carbonate, cesium carbonate, sodium halide, potassium halide, rubidium halide, cesium halide, sodium ethylenediamine tetracetic acid (EDTA), potassium EDTA, rubidium EDTA, and cesium EDTA. The M sources include the M metal oxides, alkoxides, halide salts, acetate salts, nitrate salts and sulfate salts. Specific examples of the M metal sources include, but are not limited to nitrates, chlorides, oxides, hydroxides, alkoxides. Specific examples of sources of vanadium include vanadium metal, vanadium oxides, vanadium oxysalts, $VOSO_4$, vanadium alkoxides and vanadium oxyhalides.

The crystallization process may be improved by the addition of other species to the reaction mixture. Suitable species include but are not limited to ethylene glycol, primary amines, and fluoride.

Figure 8A:
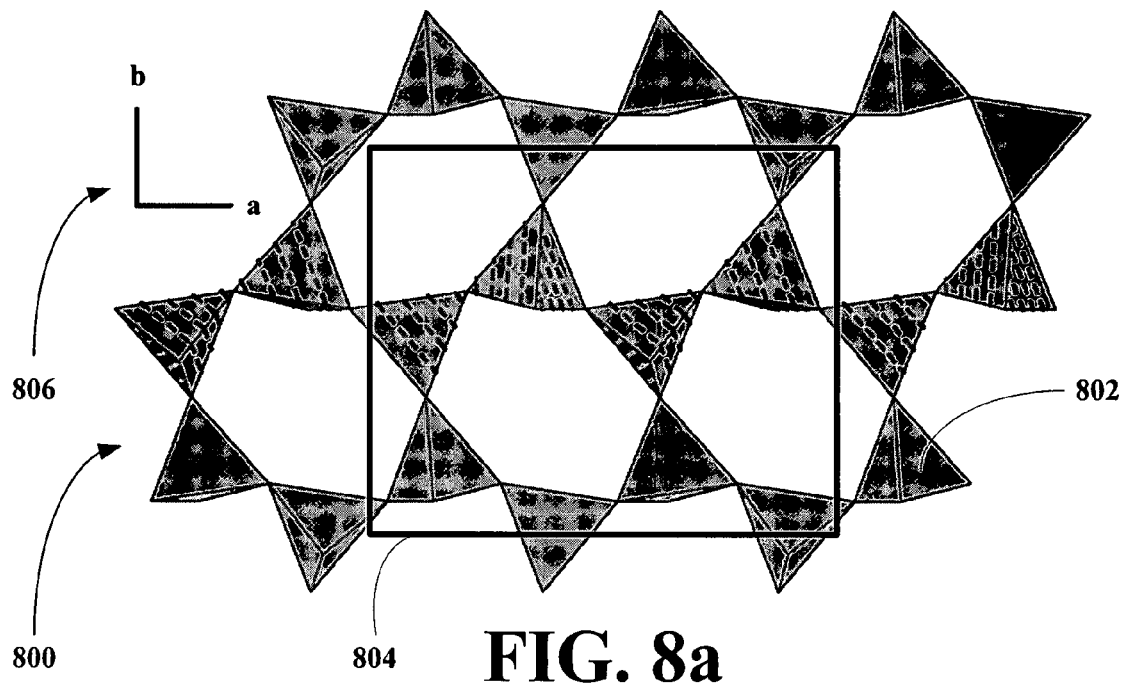
FIGS. 8a and b depict two 3D representations of a composition of this invention.
Figure 8B:
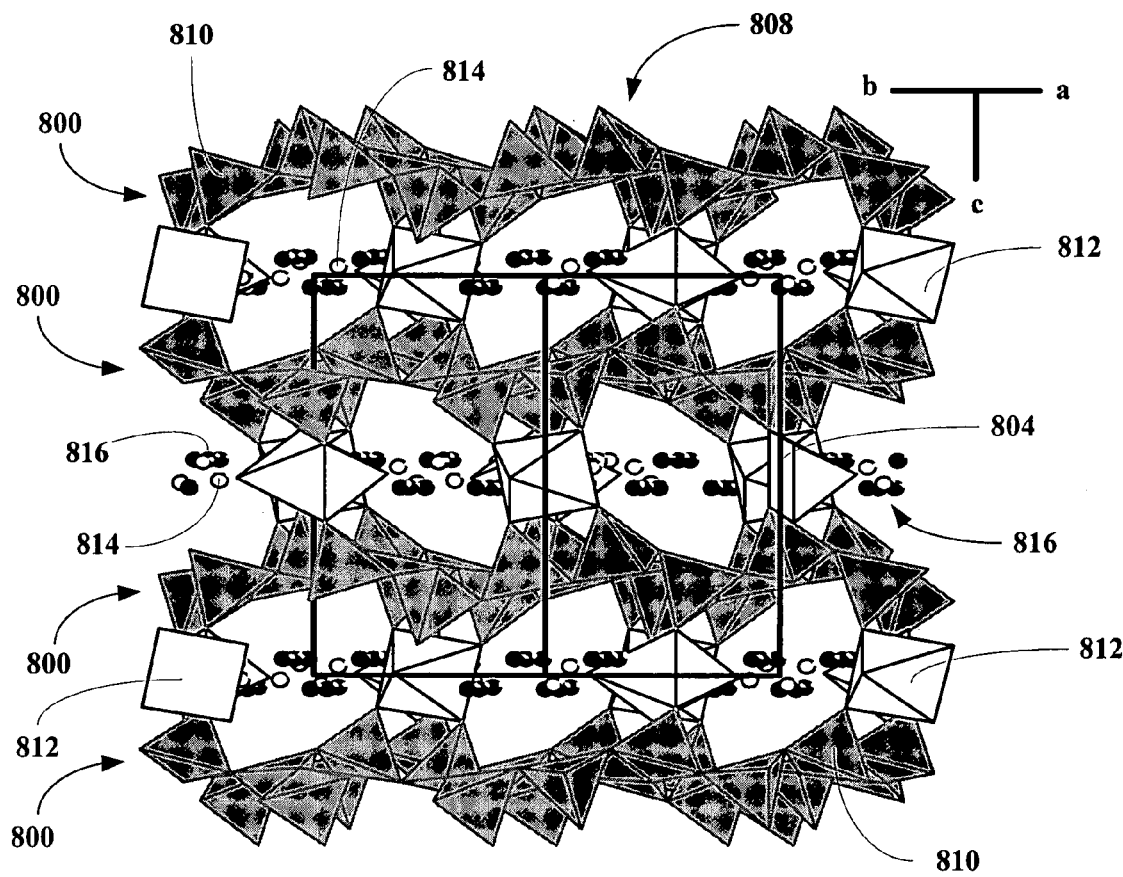

Referring now to FIGS. 8a-b, a silicate layer 800 of FIG. 1 including silicon tetrahedra 802 and a unit cell 804 having an axes system 806. Looking now at FIG. 8b, a 3D structure 808 of a composition of this invention is shown to include bridged silicon tetrahedra 810, 3D geometrical represented bridging group 812, non-framework cations 814 and water molecules 816. The structure 808 also includes the unit cell 804 and an axes system 818.

Referring now to FIGS. 9a-c, a silicate layer 900 including silicon tetrahedra 902 and a unit cell 904 having an axes system 906. Looking now at FIGS. 9b and c, a 3D structure 908 of a composition of this invention is shown to include unbridged silicon tetrahedra 910, bridged silicon tetrahedra 912, 3D geometrical represented bridging group 914, non-framework cations 916 and water molecules 918. The structure 908 also includes the unit cell 904 and an axes system 920.

Characterization

The compositions of the present invention may be characterized by several techniques familiar to those skilled in the art. Such techniques include, but are not limited to, powder X-ray diffraction, single crystal X-ray diffraction, infrared spectroscopy, UV-vis spectroscopy, multi-dimensional solid NMR, thermogravimetric analysis and nitrogen adsorption. Of particular utility for characterizing the compositions of this invention is single crystal X-ray diffraction which is used to determine their unit cells, space groups and crystal structures. It should be recognized by those skilled in the art that X-Ray diffraction patterns are not as exact and reproducible as X-Ray crystal patterns are and that different batches of the same composition may have diffraction patterns that differ somewhat in exact numeric values of the strongest peaks. However, the patterns will be similar enough to indicate that the same or very similar composition has been prepared.

EXAMPLES

The following examples are included for the sake of completeness of disclosure and to illustrate the present invention, but in no way are these examples included for the sake of limiting the scope or teaching of this disclosure.

Example 1

This example illustrates the synthesis of VSH-1K.

A solution was made by mixing 0.4 mL of a 2.5M aqueous solution of $VOSO_4.3H_2O$ and 1.18 mL of 4.24M KOH. The solution was sealed together with a 1.09 g mixture of 5.7 g of fumed silica and 20 mL of $H_2O$. The molar ratio of V:KOH:$SiO_2$ was 1:5:4. The sealed hydrothermal bomb was heated to a temperature of about 220° C. for 3 days and 18 hours. Pale blue crystals of VSH-1K were removed by vacuum filtering and washed with water and methanol. Microprobe analysis gave an atomic ratio of V:K:Si equal to 1.0:1.9:4.2 and thermogravimetric analysis indicated a water content of about 1.0 $H_2O$ per vanadium atom.

Example 2

This example illustrates the synthesis of VSH-2Cs.

A solution was made by mixing 0.4 mL of a 2.5M aqueous solution of $VOSO_4.3H_2O$ and 1.18 mL of 4.24M CsOH. The solution was sealed together with a 1.09 g mixture of 5.7 g of fumed silica and 20 mL $H_2O$. The molar ratio of V:CsOH:$SiO_2$ was 1:5:4. The sealed hydrothermal bomb was heated to a temperature of about 220° C. for 3 days and 18 hours. Pale blue crystals of VSH-2Cs were recovered by vacuum filtering and washed with water and methanol. Electron microprobe analysis gave an atomic ratio of V:Cs:Si equal to 1.0:1.9:6.6 and thermogravimetric analysis indicated a water content of about 3.1 $H_2O$ per vanadium atom.

Example 3

This example illustrates the synthesis of VSH-3Rb.

A solution was made by mixing 0.96 mL of a 2.5M aqueous solution of $VOSO_4.3H_2O$ and 1.42 mL of 4.24M RbOH. The solution was sealed together with a 0.436 g mixture of 5.7 g fumed silica and 20 mL of $H_2O$. The molar ratio of V:RbOH:$SiO_2$ was 2.4:6:1.6. The sealed hydrothermal bomb was heated to a temperature of about 220° C. for 3 days and 18 hours. Sky blue crystals of VSH-3Rb were recovered by vacuum filtering and washed with water and methanol. Electron microprobe analysis gave an atomic ratio of V:Rb:Si equal to 2.0:1.1:6.6 (Rb loss caused by beam bombardment observed), and thermogravimetric analysis: indicated a water content of about 0.8 $H_2O$ per vanadium atom.

Example 4

This example illustrates the synthesis of VSH-4Cs.

A solution was made by mixing 0.32 mL 2.5M aqueous solution of $VOSO_4.3H_2O$ and 1.42 mL 4.24M CsOH. The solution was sealed together with 0.873 g mixture of 5.7 g fumed silica and 20 mL $H_2O$. The molar ratio of V:CsOH:$SiO_2$ was 0.8:6:3.2. The sealed hydrothermal bomb was heated at 220° C. for 3 days and 18 hours. Pale blue green crystals of VSH-4Cs were recovered by vacuum filtering and washed with water and methanol. Electron microprobe analysis gave atomic ratios V:Cs:Si=1.0:1.8:4.5 and thermogravimetric analysis indicated a water content of about 2.7 $H_2O$ per vanadium atom.

Example 5

This example illustrates the synthesis of VSH-4Rb.

A solution was made by mixing 0.5 mL 1M aqueous solution of $VOSO_4.3H_2O$, 0.34 mL 8.5M RbOH, 0.66 mL $H_2O$ and 1 mL ethylene glycol. The solution was sealed together with 0.62 g mixture of 5.5 g fumed silica and 20 mL $H_2O$. The sealed hydrothermal bomb was heated at 200° C. for 3 days and 15 hours. Blue green crystals of VSH-4Rb were recovered by vacuum filtering and washed with water and methanol. Electron microprobe analysis gave atomic ratios V:Rb:Si=1.0:1.8:4.3 and thermogravimetric analysis indicated a water content of about 3.0 $H_2O$ per vanadium atom.

Example 6

This example illustrates the synthesis of VSH-6CsK

A solution was made by mixing 0.4 mL 2.5M aqueous solution of $VOSO_4.3H_2O$, 0.59 mL 4.24M KOH and 0.59 mL 4.24M CsOH. The solution was sealed together with 1.09 g mixture of 5.7 g fumed silica and 20 mL $H_2O$. The molar ratio of V:KOH:CsOH:$SiO_2$ was 1:2.5:2.5:4. The sealed hydrothermal bomb was heated at 230° C. for 3 days and 18 hours. Pale blue green crystals of VSH-6CsK were recovered by vacuum filtering and washed with water and methanol. Electron microprobe analysis gave atomic ratios V:K:Cs:Si=2.0:1.3:1.6:8.3 and thermogravimetric analysis indicated a water content of about 1.7 $H_2O$ per vanadium atom.

Example 7

This example illustrates the synthesis of VSH-6Rb.

A solution was made by mixing 0.64 mL 2.5M aqueous solution of $VOSO_4.3H_2O$ and 1.42 mL 4.24M RbOH. The solution was sealed together with 0.654 g mixture of 5.7 g fumed silica and 20 mL $H_2O$. The molar ratio of V:RbOH:$SiO_2$ was equal to 1.6:6:2.4. The sealed hydrothermal bomb was heated at 220° C. for 3 days and 18 hours. Blue green crystals of VSH-6Rb were recovered by vacuum filtering and washed with water and methanol. Single crystal structure determination indicates atomic ratios V:Rb:Si=1:2:4. and thermogravimetric analysis indicates a water content of about 3 $H_2O$ per vanadium atom.

Example 8

This example illustrates the synthesis of VSH-9CsNa.

A solution was made by mixing 0.32 mL 2.5M aqueous solution of $VOSO_4.3H_2O$, 0.71 mL 4.24M NaOH and 0.7 mL 4.24M CsOH. The solution was sealed together with 0.873 g mixture of 5.7 g fumed silica and 20 mL $H_2O$. The molar ratio of V:NaOH:CsOH:$SiO_2$ was 0.8:3:3.:3.2. The sealed hydrothermal bomb was heated at 230° C. for 3 days and 18 hours. Blue green crystals of VSH-9CsNa were recovered by vacuum filtering and washed with water and methanol. Semi-quantitative EDAX analysis gave atomic ratios V:Na:Cs:Si=1.0:0.5:1.0:4.9 and thermogravimetric analysis indicated a water content of about 4 $H_2O$ per vanadium atom.

Example 9

This example illustrates the synthesis of VSH-3K.

A solution was made by mixing 0.96 mL 2.5M aqueous solution of $VOSO_4.3H_2O$ and 0.94 mL 4.24M KOH. The solution was sealed together with 0.982 g mixture of 5.7 g fumed silica and 20 mL $H_2O$. The molar ratio of V:KOH:$SiO_2$ is equal to 2.4:4:3.6. The sealed hydrothermal bomb was heated at 220° C. for 3 days and 18 hours. Sky blue crystals of VSH-3K were recovered by vacuum filtering and washed with water and methanol. Powder X-ray diffraction indicates that VSH-3K has the same structure as VSH-3Rb.

Example 10

This example illustrates the synthesis of VSH-11RbNa

A solution was made by mixing 0.64 mL 2.5M aqueous solution of $VOSO_4.3H_2O$, 0.71 mL 4.24 NaOH and 0.71 mL 4.24M RbOH. The solution was sealed together with 0.654 g mixture of 5.7 g fumed silica and 20 mL $H_2O$. The molar ratio of V:NaOH:RbOH:$SiO_2$ is equal to 1.6:3:3:2.4. The sealed hydrothermal bomb was heated at 230° C. for 3 days and 18 hours. Pale blue crystals of VSH-11RbNa were recovered by vacuum filtering and washed with water and methanol. Single crystal structure determination indicates a chemical formula of $(Rb,Na)_2VSi_4O_{11}.xH_2O$ with x near 3.

Example 11

This example illustrates the synthesis of VSH-12Cs.

A solution was made by mixing 0.32 mL 2.5M aqueous solution of $VOSO_4.3H_2O$ and 1.42 mL 4.24M CsOH. The solution was sealed together with 0.2 g Mo metal and 0.874 g mixture of 5.7 g fumed silica and 20 mL $H_2O$. The sealed hydrothermal bomb was heated at 220° C. for 5 days and cooled in the oven over a period of one week. Blue green crystals of VSH-12Cs were recovered by vacuum filtering and washed with water and methanol as a minor phase. Electron microprobe analysis gave atomic ratios V:Cs:Si:Mo=1.0:1.2:4.5:0.0 (Cs loss caused by beam bombardment observed).

Example 12

This example illustrates the synthesis of dense films of VSH-4Cs.

A solution was made by mixing 0.32 mL 2.5M aqueous solution of $VOSO_4.3H_2O$ and 1.42 mL 4.24M CsOH. The solution was sealed together with 0.873 g of a mixture of 5.7 g fumed silica and 20 mL $H_2O$ and a molybdenum metal substrate. The molar ratio of V:CsOH:$SiO_2$ was 0.8:6:3.2. The sealed hydrothermal bomb was heated at 220° C. for 3 days and 18 hours. Pale blue green crystals of VSH-4Cs were formed directly on the substrate in the form of a dense film. The product was confirmed to be VSH-4Cs by powder X-ray diffraction. Films of VSH-4Cs were also formed by the same procedure on titanium, platinum, and vanadium metal substrates.

Example 13

This example illustrates the synthesis of VSH-13Na.

A solution was made by mixing 3.75 g fumed silica with 27 mL 4.24M aqueous solution of NaOH. 6.3 mL such solution was sealed together with 2.7 mL 2.5M aqueous solution of $VOSO_4.3H_2O$ and 0.9 mL $H_2O$. The molar ratios V:Na:Si are approximately 1:4:2. The sealed hydrothermal bomb was heated at 220° C. for 10 days. Pale blue crystals VSH-13Na were recovered by vacuum filtering and washing with water. Electron microprobe analysis gave atomic ratios V:Na:Si=1:1:2:4.0. Single crystal structure determination indicates a chemical formula of $Na_2[(VO)Si_4O_{10}].xH_2O$ with x near 3. Thermogravimetric analysis indicated a water content of about 3.3 $H_2O$ per vanadium atom.

Example 14

This example illustrates the synthesis of VSH-14Na.

A solution was made by mixing 3.75 g fumed silica with 27 mL 4.24M aqueous solution of NaOH. 1.4 mL such solution was sealed together with 0.56 mL 2.5M aqueous solution of $VOSO_4.3H_2O$ and 0.2 mL $H_2O$. The sealed hydrothermal bomb was heated at 225° C. for 6 days and 17 hours. Pale blue crystals VSH-14Na were recovered by vacuum filtering and washing with water. Single crystal structure determination indicates a chemical formula of $Na_2[(VO)Si_4O_{10}].xH_2O$ with x near 1. Thermogravimetric analysis indicated a water content of about 1.4 $H_2O$ per vanadium atom.

Example 15

This example illustrates the synthesis of CSH-1Na.

A solution was made by mixing 3.75 g fumed silica with 27 mL 4.24M aqueous solution of NaOH. 1.4 mL such solution was sealed together with 0.36 g $CuSO_4.5H_2O$ and 0.5 mL $H_2O$. The sealed hydrothermal bomb was heated at 240° C. for 2 days. Pale blue crystals CSH-1Na were recovered by vacuum filtering and washing with water. Single crystal structure determination indicates a chemical formula of $Na_4[Cu_2(Si_{12}O_{27}(OH)_2].xH_2O$ with x near 6. Thermogravimetric analysis indicated a water content of about 3 $H_2O$ per copper atom.

Example 16

This example illustrates the synthesis of USH-1Na.

A mixture was made by mixing 5.7 g fumed silica and 20 mL $H_2O$. 0.87 g such mixture was sealed together with 1.65 mL 4.24M NaOH aqueous solution, 0.50 g $UO_2(NO_3)_2$ $6H_2O$ and 4 mL $H_2O$. The molar ratio U:Na:Si was 1:5:4. The sealed hydrothermal bomb was heated at 230° C. for 7 days. Yellow crystals of USH-1Na were recovered by vacuum filtering and washing with water. Chemical analysis gave the results: Na 7.12%, Si 16.63%, U 38.95%. Single crystal structure determination indicates a chemical formula of $Na_2[(UO_2)Si_4O_{10}].xH_2O$ with x near 2. Thermogravimetric analysis indicated a water content of about 2 $H_2O$ per uranium atom.

Example 17

This example illustrates the synthesis of USH-6Cs.

A mixture was made by mixing 0.29 g fumed silica, 0.94 mL 4.24M CsOH aqueous solution, 0.30 g $UO_2(NO_3)_2$ $6H_2O$ and 5 mL $H_2O$. The molar ratios U:Cs:Si are approximately 1:5:6. The mixture was sealed in a hydrothermal bomb and was heated at 230° C. for 7 days. Yellow crystals of USH-6Cs were recovered by vacuum filtering and washing with water. Single crystal structure determination indicates a chemical formula of $Cs_2(UO_2)Si_6O_{14}(H_2O)_2$.

Example 18

Ion Exchange Properties

The alkali metal cations in the compositions of the present invention can be ion exchanged as illustrated by the results for VSH-4X, 7X and 9X.

VSH-9X:

VSH-9CsNa powder was heated and stirred in 30 mL 1M $LiClO_4$ solution at 50° C. for 3 h, 15 h, or 40 h, and then washed with de-ionized water and methanol. After ion exchange the sample was characterized by X-ray powder diffraction. The measured diffraction pattern matches the pattern simulated from the structure data by replacing Cs and Na atoms with Li. The relative intensity changes of the low angle peaks (<20°) are particularly evident (Table I).

Elemental analysis of VSH-9CsNa after the lithium ion exchange gave: 2.48% Li, 11.76% Cs, 0.034% Na, 11.05% V, 25.18% Si, which can be compared with calculated values for $CsNa(VO)(Si_4O_{10}).3H_2O$: 24.2% Cs, 4.19% Na, 9.27% V, 20.5% Si ;and $Li_2(VO)(Si_4O_{10}).3H_2O$: 3.4% Li, 12.5% V, 27.6% Si

VSH-6X:

VSH-6Rb was ion exchanged in 1M $LiClO_4$ solution in the same way. After ion exchange the sample was characterized by X-ray powder diffraction. The measured diffraction pattern matches the pattern simulated from the structure data by replacing Rb with Li. The relative intensity changes of the low angle peaks are particularly evident (Table I). Elemental analysis after the lithium ion exchange gave:. 2.2% Li, 7.12% Rb, 10.67% V, 25.91% Si. The ratio of Li:Rb:V:Si is equal to 1.52:0.4:1:4.4 after the ion exchange, TGA measured the sample weight loss is 17.22% and equals to 4 $H_2O$. Before the ion exchange, the VSH-6Rb weight loss is 9.48% corresponding to 3 $H_2O$. The TGA measurement was carried out by using a TA 2950 Thermogravimetric Analyzer with a heating rate of 5° C./min to 550° C. in air.

VSH-4X:

The ion exchange of VSH-4Cs was carried out in 1M $(NH_4)_2SO_4$ solution at 52° C. for 6 d. After ion exchange the sample was characterized by X-ray powder diffraction. The measured diffraction pattern matches the pattern simulated from the structure data by replacing Cs with $NH_4$. The relative intensity changes of the low angle peaks are particularly evident. After the ion exchange, the sample weight loss is 15.68% at 300° C. and 17.14% at 700° C. Before the ion exchange, the VSH-4Cs weight loss is 7.48% which is equal to 2.7 $H_2O$.

Characteristics of the Compositions of Examples 1-18

The compounds of the present invention can be identified by their characteristic X-ray diffraction patterns. Examples of d spacings and relative intensities for the ten strong lines obtained from powder diffraction patterns for VSH-1K through USH-6Na and the ion exchanged samples VSH-4X, VSH-6X anid VSH-9-X are shown in Table I. These data are sufficient to identify these examples of compounds of the present invention.

TABLE I

Powder X-Ray Diffraction Patterns

| VSH-1K | | VSH-2Cs | | VSH-3K | | VSH-3Rb | | VSH-4Cs | | VSH-4CsX | | VSH-4Rb | |
|---|---|---|---|---|---|---|---|---|---|---|---|---|---|
| d(Å) | I(rel.) | d(Å) | I(rel.) | d(Å) | I(rel.) | d(Å) | I(rel.) | d(Å) | I(rel.) | d(Å) | I(rel.) | d(Å) | I(rel.) |
| 6.262 | 23 | 8.54 | 44 | 6.389 | 100 | 6.501 | 33 | 7.131 | 35 | 7.758 | 100 | 7.841 | 21 |
| 5.742 | 28 | 6.559 | 12 | 4.872 | 16 | 4.444 | 51 | 6.658 | 49 | 6.930 | 32 | 6.618 | 76 |
| 4.382 | 63 | 4.861 | 10 | 4.391 | 57 | 4.177 | 64 | 5.095 | 19 | 6.638 | 89 | 4.027 | 98 |
| 4.139 | 69 | 4.452 | 14 | 4.146 | 64 | 3.998 | 62 | 4.872 | 20 | 5.037 | 73 | 3.9 | 40 |
| 3.948 | 94 | 4.281 | 100 | 3.955 | 79 | 3.304 | 100 | 4.012 | 88 | 4.034 | 78 | 3.373 | 44 |
| 3.251 | 100 | 4.108 | 18 | 3.646 | 28 | 3.13 | 67 | 3.928 | 67 | 3.948 | 84 | 3.013 | 100 |
| 3.083 | 54 | 3.688 | 23 | 3.294 | 64 | 3.03 | 34 | 3.456 | 68 | 3.504 | 46 | 2.778 | 63 |
| 2.924 | 39 | 3.117 | 24 | 3.104 | 35 | 2.869 | 45 | 3.03 | 100 | 3.017 | 58 | 2.68 | 43 |
| 2.558 | 37 | 2.955 | 25 | 2.833 | 39 | 2.613 | 40 | 2.974 | 60 | 2.914 | 45 | 2.538 | 40 |
| 2.429 | 34 | 2.851 | 42 | 2.584 | 40 | 2.442 | 57 | 2.719 | 61 | 2.779 | 36 | 2.372 | 30 |

| VSH-6CsK | | VSH-6Rb | | VSH-6RbX | | VSH-9CsNa | | VSH-9CsNaX | | VSH-11RbNa | |
|---|---|---|---|---|---|---|---|---|---|---|---|
| d(Å) | I(rel.) | d(Å) | I(rel.) | d(Å) | I(rel.) | d(Å) | I(rel.) | d(Å) | I(rel.) | d(Å) | I(rel.) |
| 7.178 | 18 | 7.841 | 25 | 11.554 | 47 | 10.154 | 34 | 10.297 | 100 | 14.889 | 59 |
| 6.579 | 56 | 6.658 | 81 | 9.002 | 70 | 7.897 | 15 | 7.758 | 9 | 9.110 | 42 |
| 4.131 | 27 | 4.027 | 87 | 7.792 | 10 | 7.178 | 18 | 6.844 | 18 | 7.896 | 51 |
| 3.707 | 31 | 3.445 | 57 | 7.230 | 28 | 6.698 | 13 | 5.712 | 32 | 6.474 | 84 |
| 3.435 | 56 | 3.373 | 47 | 6.623 | 96 | 5.119 | 20 | 5.154 | 16 | 5.915 | 90 |
| 3.048 | 100 | 3.005 | 100 | 4.102 | 31 | 4.893 | 26 | 4.382 | 84 | 4.990 | 51 |
| 2.998 | 48 | 2.785 | 79 | 3.415 | 80 | 4.306 | 85 | 4.123 | 23 | 4.331 | 73 |
| 2.799 | 28 | 2.687 | 39 | 3.202 | 100 | 3.424 | 100 | 3.430 | 76 | 3.104 | 43 |
| 2.649 | 27 | 2.533 | 44 | 3.014 | 27 | 2.998 | 48 | 3.075 | 68 | 3.364 | 100 |
| 2.578 | 23 | 2.367 | 37 | 2.799 | 62 | 2.649 | 34 | 2.598 | 35 | 3.083 | 44 |

| VSH-12Cs | | VSH-13Na | | VSH-14Na | | CSH-1Na | | USH-1Na | | USH-6Cs | |
|---|---|---|---|---|---|---|---|---|---|---|---|
| d(Å) | I(rel.) | d(Å) | I(rel.) | d(Å) | I(rel.) | d(Å) | I(rel.) | d(Å) | I(rel.) | d(Å) | I(rel.) |
| 4.621 | 17 | 8.46 | 100 | 8.24 | 16 | 12.789 | 100 | 7.194 | 19 | 9.006 | 38 |
| 4.063 | 33 | 6.876 | 25 | 5.915 | 54 | 11.658 | 33 | 6.807 | 100 | 6.357 | 11 |
| 3.925 | 20 | 4.974 | 22 | 5.816 | 24 | 6.549 | 17 | 6.069 | 29 | 6.269 | 19 |
| 3.735 | 31 | 4.564 | 27 | 4.345 | 92 | 5.792 | 19 | 5.571 | 42 | 5.877 | 29 |
| 3.590 | 100 | 4.326 | 14 | 4.311 | 68 | 5.460 | 28 | 4.945 | 59 | 4.511 | 19 |
| 3.517 | 78 | 4.017 | 35 | 3.95 | 18 | 4.945 | 16 | 4.53 | 75 | 4.384 | 22 |
| 3.422 | 86 | 3.602 | 47 | 3.845 | 75 | 4.612 | 61 | 4.311 | 32 | 3.852 | 29 |
| 3.301 | 24 | 3.298 | 44 | 3.61 | 19 | 4.552 | 13 | 4.058 | 37 | 3.692 | 27 |
| 3.262 | 35 | 2.966 | 20 | 3.381 | 46 | 4.304 | 18 | 3.597 | 37 | 3.582 | 51 |
| 3.225 | 28 | 2.778 | 25 | 3.243 | 100 | 3.946 | 55 | 3.486 | 72 | 3.14 | 100 |

More detailed structural data for examples of the MSH-n family were estabished by crystallographic measurements on small single crystals. All measurements were made with a Siemens SMART platform diffractometer equipped with a 1K CCD area detector. In a typical experiment a hemisphere of data (1271 frames at 5 cm detector distance) was collected using a narrow-frame method with scan widths of 0.30° in ω and an exposure time of 20-40 s/frame. The first 50 frames were re-measured at the end of data collection to monitor instrument and crystal stability, and the maximum correction applied to the intensities was <1%. The data were integrated using the Siemens SAINT program, with the intensities corrected for Lorentz factor, polarization, air absorption, and absorption due to variation in the path length through the detector faceplate.

The structures were solved by direct methods and refined on $F^2$ by full-matrix least squares using SHELXTL. Crystallographic data of the compounds are summarized in Table II.

The crystallographic data confirm that these examples have the compositions and structures of the present invention with the values of r, s, p, q and t in $A_r[M_s\{(Si_2O_5)_p (SiO_2)_q\}] \cdot tH_2O$ given in Table II.

TABLE II

Crystallographic data for MSH-n

VSH-1K

| | |
|---|---|
| A = K, r = 2, M = VO, s = 1 | p = 2, q = 0, t = 1 |
| Crystal system | Orthorhombic |
| Space group | P bca (no. 61) |
| Unit cell dimensions | a = 10.2582(23) Å |
| | b = 8.2598(18) Å |
| | c = 12.9807(29) Å |
| Cell volume | 1099.9 Å$^3$ |

VSH-2Cs

| | |
|---|---|
| A = Cs, r = 2, M = VO, s = 1 | p = 2, q = 2, t = 3 |
| Crystal system | Orthorhombic |
| Space group | C mca (no. 64) |
| Unit cell dimensions | a = 17.0508(18) Å |
| | b = 8.6630(9) Å |
| | c = 12.3844(14) Å |
| Cell volume | 1829.3 Å$^3$ |

VSH-3K

| | |
|---|---|
| A = K, r = 2, M = VO, s = 2 | p = 3, q = 0, t = 1.6 |
| Crystal system | Orthorhombic |

TABLE II-continued

Crystallographic data for MSH-n

| | |
|---|---|
| Space group | P bc2 (no.29) |
| Unit cell dimensions | a = 15.494(2) Å |
| | b = 8.2673(9) Å |
| | c = 13.147(2) Å |
| Cell volume | 1683.9 Å$^3$ |

VSH-3Rb

A = Rb, r = 2, M = VO, s = 2     p = 3, q = 0, t = 1.6

| | |
|---|---|
| Crystal system | Orthorhombic |
| Space group | C mc2$_1$ (no. 36) |
| Unit cell dimensions | a = 15.6143(90) Å |
| | b = 8.3603(48) Å |
| | c = 13.1424(75) Å |
| Cell volume | 1715.6 Å$^3$ |

VSH-4Cs

A = Cs, r = 2, M = VO, s = 1     p = 2, q = 0, t = 2.7

| | |
|---|---|
| Crystal system | Trigonal |
| Space group | R −3m (no. 166) |
| Unit cell dimensions | a = 13.3053(32) Å |
| | c = 21.415(7) Å |
| Cell volume | 3283.2 Å$^3$ |

VSH-4Rb

A = Rb, r = 2, M = VO, s = 1     p = 2, q = 0, t = 3

| | |
|---|---|
| Crystal System | Trigonal |
| Space group | R −3m (no. 166) |
| Unit cell dimensions | a = 13.2878(8) Å |
| | c = 21.256(27) Å |
| Cell Volume | 3250.3 Å$^3$ |

VSH-6CsK

A = (K, Cs), r = 2, M = VO     p = 2, q = 0, t = 3

| | |
|---|---|
| disordered, subcell | |
| Crystal system | Trigonal |
| Spacegroup | P 3 1 c (no. 159) |
| Unit cell dimensions | a = 13.1100(145) Å |
| | c = 14.3492(211) Å |
| Cell volume | 2135.8 Å$^3$ |

VSH-6Rb

A = Rb, r = 2, M = VO, s = 1     p = 2, q = 0, t = 3

| | |
|---|---|
| disordered, subcell | |
| Crystal system | Hexagonal |
| Space group | P 6$_3$/m m c (no. 194) |
| Unit cell dimensions | a = 13.1698(6) Å |
| | c = 14.5054(8) Å |
| Cell volume | 2178.8 Å$^3$ |

VSH-9CsNa

A = (Cs, Na), r = 2, M = VO, s = 1     p = 2, q = 0, t = 4

| | |
|---|---|
| Crystal system | Trigonal |
| Space group | R3m (No. 160) |
| Unit cell dimensions | a = 13.5674(7) Å |
| | c = 21.8552(2) Å |
| Cell volume | 3484.0 Å$^3$ |

VSH-11RbNa

A = (Rb, Na), r = 2, M = VO, s = 1     p = 2, q = 0, t = 2.4

| | |
|---|---|
| Crystal system | Trigonal |
| Space group | R −3m (no. 166) |
| Unit cell dimensions | a = 18.2124(7) Å |
| | c = 45.7519(24) Å |

TABLE II-continued

Crystallographic data for MSH-n

| | |
|---|---|
| Cell volume | 13142.4 Å$^3$ |

VSH-12Cs

A = Cs, r = 2, M = VO, s = 1     p = 2, q = 0, t = 1.2

| | |
|---|---|
| Subcell | |
| Crystal system | Orthorhombic |
| Space group | P bam (no. 55) |
| Unit cell dimensions | a = 12.690(3) Å |
| | b = 14.916(3) Å |
| | c = 6.984(1) Å |
| Cell volume | 1321.7 Å$^3$ |

VSH-13Na

A = Na, r = 2, M = VO, s = 1     p = 2, q = 0, t = 3.3

| | |
|---|---|
| Crystal system | Orthorhombic |
| Space group | I mma (no. 74) |
| Unit cell dimensions | a = 14.409(9) Å |
| | b = 9129(6) Å |
| | c = 10.452(7) Å |
| Cell volume | 1374.8 Å$^3$ |

VSH-14Na

A = Na, r = 2, M = VO, s = 1     p = 2, q = 0, t = 1.4

| | |
|---|---|
| Crystal System | Monoclinic |
| Space group | C 2/c (no. 15) |
| Unit cell dimensions | a = 27.544(4) Å |
| | b = 8.690(1) Å |
| | c = 10.061(2) Å |
| | β = 109.6(1)° |
| Cell volume | 2268.9 Å$^3$ |

CSH-1Na

A = Na, r = 4, M = Cu, s = 2     p = 5, q = 2, t = 6

| | |
|---|---|
| Crystal system | Orthorhombic |
| Space group | C mcm (no. 63) |
| Unit cell dimensions | a = 25.578(4) Å |
| | b = 13.098(2) Å |
| | c = 9.980(1) Å |
| Cell volume | 3313.4 Å$^3$ |

USH-1Na

A = Na, r = 2, M = UO$_2$, s = 1     p = 2, q = 0, t = 2

| | |
|---|---|
| Crystal system | Monoclinic |
| Space group | C 2/m (no.12) |
| Unit cell dimensions | a = 12.7718(7) Å |
| | b = 13.6139(7) Å |
| | c = 8.2466(4) Å |
| | β = 119.3(1)° |
| Cell volume | 1250.9 Å$^3$ |

USH-6Cs

A = Cs, r = 2, M = UO$_2$, s = 1     p = 2, q = 2, t = 2

| | |
|---|---|
| Crystal system | Triclinic |
| Space group | P-1 (no. 2) |
| Unit cell dimensions | a = 7.396(1) Å |
| | b = 10.152(1) Å |
| | c = 13.220(2) Å |
| | α = 69.2(1)° |
| | β = 88.6(1)° |
| | γ = 72.6(1)° |
| Cell volume | 1881.8 Å$^3$ |

The water contents of the samples were measured by Thermogravimetric analysis (TGA) carried out in a simulated air flow with a heating rate of 5°/min, on a TA Instruments Hi-Res 2950 system. The water contents and the maximum temperature to which the samples were heated are given in Table III. After the TGA experiments, the samples were cooled in the same atmosphere to ambient temperature. Samples were checked for retention of crystallinity by powder X-ray diffraction. In all cases, the powder X-ray diffraction patterns showed that the samples remained crystalline though in some cases there was evidence of line broadening. These data do not necessarily set the upper bound on stability, but they do show that the samples can be dehydrated and retain structure in a temperature range important in catalysis.

TABLE III

Water Contents and Maximum Temperatures

| Compound | Water Content | T ° C.* |
|---|---|---|
| VSH-1K | 1.0 | 700 |
| VSH-1-2Cs | 3.0 | 500 |
| VSH-3Rb | 1.6 | 500 |
| VSH-3K | 1.6 | 450 |
| VSH-4Cs | 2.7 | 525 |
| VSH-4Rb | 3.0 | 330 |
| VSH-6CsK | 1.65 | 400 |
| VSH-6Rb | 3.0 | 500 |
| VSH-9CsNa | 4.0 | 330 |
| VSH-13Na | 3.3 | 350 |
| VSH-14Na | 1.4 | 300 |

*TGA maximum temperature used in the dehydration.

Figure 10:
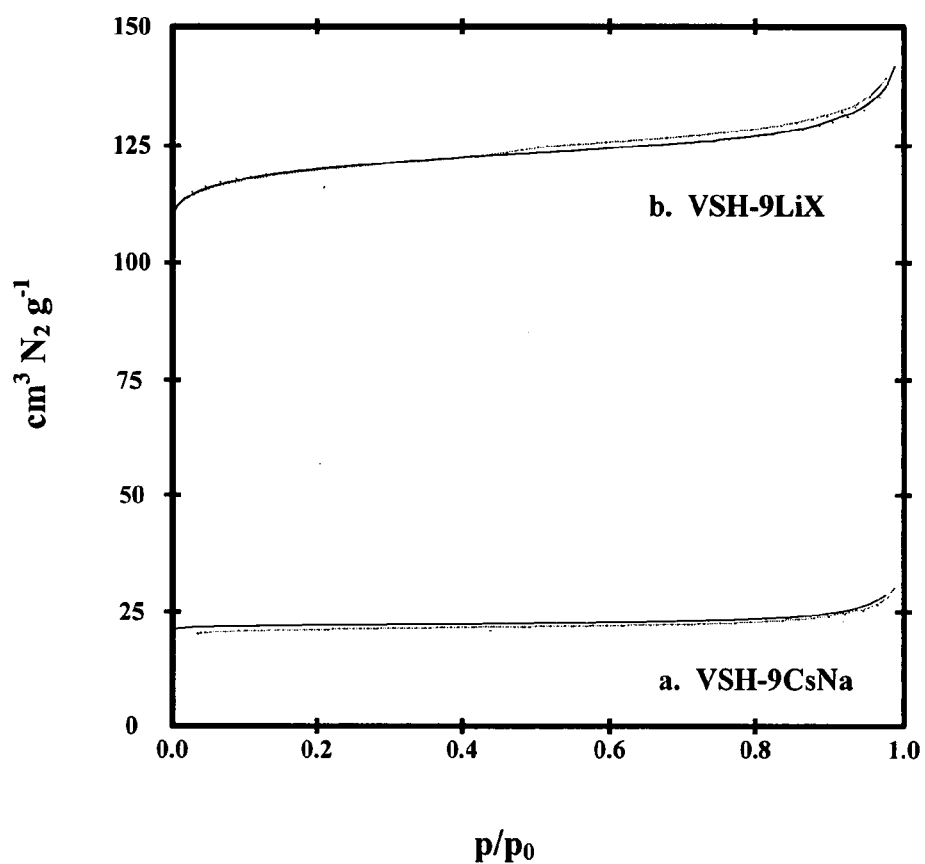
FIG. 10 graphically depicts the nitrogen absorption curves for two composition of this invention.

Nitrogen absorption isotherms were measured using a Quantachrome Nova 2000 Instrument. Samples were outgassed by heating under vacuum at 300° C. before the nitrogen absorption measurements. The nitrogen absorption data for VSH-9CsNa and VSH-9LiX are shown in FIG. 10. The amounts of nitrogen absorbed in cm$^3$/g of sample correspond to surface areas of 81 m$^2$/g and 453 m$^2$/g, respectively and are in the expected range for microporous materials.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skilled in the art may appreciate changes and modification that may be made which do not depart from the scope and spirit of the invention as described above and claimed hereafter.

We claim:

1. A 3D silicate composition comprising a plurality of silicate layers consisting of SiO$_4$ tetrahedra and sufficient bridging groups to form a substantially stable 3D structure and cations and water molecules that occupy non-framework positions, wherethe bridging groups link adjacent silicate layers and share at least one oxygen atom of a SiO$_4$ tetrahedron in each linked silicate layer and where the cations are selected from the group consisting of alkali metals, Sr, Ba and mixtures or combinations thereof.

2. The composition of claim 1, wherein the at least one bridging group includes a transition metal.

3. The composition of claim 1, wherein each bridging group includes a transition metal.

4. The composition of claim 1, wherein the bridging groups are selected from the group consisting of non-transition metal-containing bridging groups and transition metal-containing bridging groups.

5. The composition of claim 1, wherein the cations are selected from the group consisting of alkali metals and mixtures or combinations thereof.

6. The composition of claim 1, wherein the cations are selected from the group consisting of Na, K, Rb, Cs and mixtures or combinations thereof.

7. A method for preparing layered silicates comprising the steps contacting in a hydrothermal bomb underhydrothermal crystallization conditions a source of silicon oxide, at least one bridging group precursor or species containing a transition metal and an alkali metal hydroxide, alkaline earth metal hydroxide or mixtures thereof at required molar percentages to form a composition having a formula:

$$[M_{s1}\{(Si_2O_5)_{p1}(SiO_2)_{q1}\}]_m A_{r1} \cdot tH_2O$$

where:

$[M_{s1}\{(Si_2O_5)_{p1}(SiO_2)_{q1}\}]_m$ represents a first layered structure, $\{(Si_2O_5)_{p1}(SiO_2)_{q1}\}$ represents a first silicate layer consisting of SiO$_4$ tetrahedra, p1 and q1 have values representing a configuration of the first silicate layer, and m has a value representing the number of first layers and ranges between about 5 and about 1,000,000, M represents bridging groups linking adjacent first silicate layers through at least one oxygen atom in a SiO$_4$ tetrahedron in each of the linked first silicate layers, at least one M including a transition metal, s1 has a value representing the number of M bridgiing groups between adjacent first silicate layers, which is a value sufficient to form a substantially stable 3D composition, A is a cation selected from the groups consisting alkali metal cations and alkaline earth metal cations, r1 has a value representing the number of A cations needed to render the composition neutral, t has a value representing the state of hydration of the composition, and the A cations and the water molecules occupy non-framework positions in the composition as synthesized.

8. The method of claim 7, wherein the hydrothermal crystallization conditions comprise a pH between about 7 and about 14, at a reaction temperature between about 100° C. and about 300° C. and for a time sufficient to form crystals.

9. The method of claim 8, wherein the pH is between about 8 and about 14.

10. The method of claim 8, wherein the pH is between about 8 and about 13.

11. Themethod of claim 8, wherein the pH is between about 9 and about 13.

12. The method of claim 8, wherein the reaction temperature is between about 150° C. and about 250° C.

13. The method of claim 8, wherein the reaction temperature is between about 175° C. and about 225° C.

14. The method of claim 7, further comprising the step of: removing the composition and heating the composition to an elevated temperature.

15. The method of claim 14, wherein the elevated temperature is greater than about 400° C.

16. The method of claim 14, wherein the heating is under vacuum.

17. The method of claim 7, further comprising the step of: adding an organic base to adjust the pH of the reactant mixture and to promote crystallization.

18. A composition comprising a general formula:

$$[M_{s1}\{(Si_2O_5)_{p1}(SiO_2)_{q1}\}]_m A_{r1} \cdot tH_2O$$

where:
- $[M_{s1}\{(Si_2O_5)_{p1}(SiO_2)_{q1}\}]_m$ represents a first layered structure,
  - $\{(Si_2O_5)_{p1}(SiO_2)_{p1}\}$ represents a first silicate layer consisting of $SiO_4$ tetrahedra,
    - p1 and q1 have values representing a configuration of the first silicate layer, and
  - m has a value representing the number of first layers and ranges between about 5 and about 1,000,000,
- M represents bridging groups linking adjacent first silicate layers through at least one oxygen atom in a $SiO_4$ tetrahedron in each of the linked first silicate layers, at least one M including a transition metal,
  - s1 has a value representing the number of M bridging groups between adjacent first silicate layers, which is a value sufficient to form a substantially stable 3D composition,
- A is a cation selected from the groups consisting Na, K, Rb, Cs, Sr, Ba and mixtures and combinations thereof,
  - r1 has a value representing the number of A cations needed to render the composition neutral,
- t has a value representing the state of hydration of the composition, and the A cations and the water molecules occupy non-framework positions in the composition as synthesized.

19. The composition of claim 18, wherein the transition metal containing M bridging groups are selected from the group consisting of $VO^{2+}$, $VO(H_2O)^{2+}$, $Cu(H_2O)_2^{2+}$, $ZrF_2^{2+}$, $NbOF^{2+}$, $Co(H_2O)_2^{2+}$ and $UO_2^{2+}$; wherein s1 ranges between about ⅛ and about 2; wherein m range between about 10 and about 500,000; and wherein $0 \leq q/(2p) \leq 1$.

20. The composition of claim 18, further comprising:

$$A'_{r2}$$

where:
- A' is an ion-exchanged cation selected from the groups consisting of $H^-$, alkali metal cations, alkaline earth metal cations, and other ion-exchangeable cations,
  - r1 and r2 have values representing the number of A and A' cations needed to render the composition neutral,
- the A' cations also occupy non-framework positions in the composition as synthesized.

21. The composition of claim 20, wherein the A' cations are selected from the group consisting of H, Na, K, Rb, Cs, Ca, Sr, Ba and mixtures and combinations thereof; wherein the transition metal containing M bridging groups are selected from the group consisting of $VO^{2+}$, $VO(H_2O)^{2+}$, $Cu(H_2O)_2^{2+}$, $ZrF_2^{2+}$, $NbOF^{2+}$, $Co(H_2O)_2^{2+}$ and $UO_2^{2+}$; wherein s1 range between about ⅛ and about 2; wherein m range between about 10 and about 500,000; and wherein $0 \leq q/(2p) \leq 1$.

22. The composition of claim 18, wherein the cations are selected from the group consisting of Na, K, Rb, Cs and mixtures or combinations thereof.

23. A composition comprising a general formula:

$$[M_{s1}\{(Si_2O_5)_{p1}(SiO_2)_{q1}\}]_M[M'_{s2}\{(Si_2O_5)_{p2}(SiO_2)_{q2}\}]_n M''_{s3} A_{r1} \cdot tH_2O$$

where:
- $[M_{s1}\{(Si_2O_5)_{p1}(SiO_2)_{q1}\}]_m$ represents a first layered structure,
  - $\{(Si_2O_5)_{p1}(SiO_2)_{q1}\}$ represents a first silicate layer consisting of $SiO_4$ tetrahedra,
    - p1 and q1 have values representing a configuration of the first silicate layer, and
  - m has a value representing the number of first layers and ranges between about 5 and about 1,000,000,
- M represents bridging groups linking adjacent first silicate layers through at least one oxygen atom in a $SiO_4$ tetrahedron in each of the linked first silicate layers, at least one M including a transition metal,
  - s1 has a value representing the number of M bridging groups between adjacent first silicate layers, which is a value sufficient to form a substantially stable 3D composition,
- $[M_{s2}\{(Si_2O_5)_{p2}(SiO_2)_{q2}\}]_n$ represents a second layered structure,
  - $\{(Si_2O_5)_{p2}(SiO_2)_{q2}\}$ represents a second silicate layer consisting of $SiO_4$ tetrahedra,
    - p2 and q2 have values representing a confagtiration of the second silicate layer and
  - n has a value representing the number of second silicate layers and ranges between about 5 and about 1,000,000,
- M, M' and M'' are the same or different,
- M' represents bridging groups interposed between adjacent second silicate layers, at least one M' including a transition metal,
  - s2 has a value representing the number of M' bridging groups between adjacent second silicate layers,
- M'' represents bridging groups interposed between the first and second layered structure, at least one M'' including a transition metal,
  - s3 has a value representing the number of M'' bridging groups between the first and second structures, and
  - the values of s1, s2, and s3 are sufficient to form a substantially stable 3D composition, the first and second silicate layers are different,
- A is a cation selected from the groups consisting alkali metal cations and alkaline earth metal cations,
  - r1 has a value representing the number of A cations needed to render the composition neutral,
- t has a value representing the state of hydration of the composition, and the A cations and the water molecules occupy non-framework positions in the composition as synthesized.

24. The composition of claim 23, wherein the A cations are selected from the group consisting of Na, K, Rb, Cs, Ca, Sr, Ba and mixtures and combinations thereof; wherein the transition metal containing M, M' and M'' bridging groups are selected from the group consisting of $VO^{2+}$, $VO(H_2O)^{2+}$, $Cu(H_2O)_2^{2-}$, $ZrF_2^{2+}$, $NbOF^{2+}$, $Co(H_2O)_2^{2+}$ and $UO_2^{2+}$; wherein s1, s2 and s3 range between about ⅛ and about 2; wherein n and m range between about 10 and about 500,000; and wherein $0 \leq q/(2p) \leq 1$.

25. The composition of claim 23, further comprising:

$$A'_{r2}$$

where:
- A' is an ion-exchanged cation selected from the groups consisting of $H^+$, alkali metal cations, alkaline earth metal cations, and other ion-exchangeable cations,
  - r1 and r2 have values representing the number of A and A' cations needed to render the composition neutral,
- the A' cations also occupy non-framework positions in the composition as synthesized.

26. The composition of claim 25, wherein the A' cations are selected from the group consisting of H, Na, K, Rb, Cs, Ca, Sr, Ba and mixtures and combinations thereof;

wherein the transition metal containing M, M' and M" bridging groups are selecled from the group consisting of $VO^{2+}$, $VO(H_2O)^{2+}$, $Cu(H_2O)_2^{2+}$, $ZrF_2^{2+}$, $NbOF^{2+}$, $Co(H_2O)_2^{2+}$; wherein s1, s2 and s3 range between about 1/8 and about 2; wherein n and m range between about 10 and about 500,000; and wherein $0 \leq q/(2p) \leq 1$.

* * * * *